US007808478B2

(12) United States Patent
Choi et al.

(10) Patent No.: US 7,808,478 B2
(45) Date of Patent: Oct. 5, 2010

(54) AUTONOMOUS HANDHELD DEVICE HAVING A DRAWING TOOL

(75) Inventors: Joon-Hyuk Choi, Seoul (KR); Eli Ben-Ami, Herzlia (IL); Israel Disatnik, Bat-Hefer (IL); Natan Linder, Motza Illit (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1015 days.

(21) Appl. No.: 11/503,119

(22) Filed: Aug. 14, 2006

(65) Prior Publication Data

US 2007/0067745 A1   Mar. 22, 2007

Related U.S. Application Data

(60) Provisional application No. 60/709,794, filed on Aug. 22, 2005.

(51) Int. Cl.
G09G 5/08 (2006.01)
G06K 9/40 (2006.01)
G06K 9/00 (2006.01)
G06F 3/033 (2006.01)

(52) U.S. Cl. ............... 345/158; 382/274; 382/181; 382/188; 345/179

(58) Field of Classification Search ......... 345/156–184; 382/103, 181, 187–194, 197–204, 312–319, 382/107, 274, 283; 715/856–864
See application file for complete search history.

(56) References Cited

U.S. PATENT DOCUMENTS 5,387,947 A * 2/1995 Shin ..................... 348/699
6,418,166 B1 * 7/2002 Wu et al. ............... 375/240.12
6,594,397 B1 7/2003 Hu
2002/0080239 A1 * 6/2002 Ikeda et al. ................ 348/207
2002/0198030 A1 12/2002 Shima
2003/0231856 A1 12/2003 Ikeda
2005/0116045 A1 * 6/2005 Chang .................. 235/472.03
2005/0216867 A1 9/2005 Marvit et al.
2005/0276333 A1 12/2005 Park
2005/0285947 A1 12/2005 Grindstaff et al.
2006/0067589 A1 3/2006 Perlmutter et al.
2006/0177103 A1 8/2006 Hildreth
2006/0190750 A1 8/2006 Maggi et al.

(Continued)

FOREIGN PATENT DOCUMENTS

CN    1395401    2/2003

(Continued)

OTHER PUBLICATIONS

Office Action Dated Jul. 10, 2009 From the State Intellectual Property Office of the People's Republic of China Re: Application No. 2006800306580 and Its Translation Into English.

(Continued)

*Primary Examiner*—Bipin Shalwala
*Assistant Examiner*—Keith Crawley

(57) ABSTRACT

An autonomous handheld device comprises a drawing module having drawing capabilities for electronically editing a drawing and a motion sensing feature for sensing self-motion. The autonomous handheld device is configured to associate the motion sensing feature with the drawing capability thereby to allow sensed motion of the motion sensing feature to modify the electronic editing.

19 Claims, 22 Drawing Sheets

U.S. PATENT DOCUMENTS

2006/0285587 A1  12/2006  Luo et al.
2007/0041058 A1  2/2007   Disatnik et al.
2007/0041616 A1  2/2007   Lee et al.

FOREIGN PATENT DOCUMENTS

| | | |
|---|---|---|
| JP | 2003-008693 | 1/2003 |
| JP | 2004-120514 | 4/2004 |
| KR | 10-2008-7004240 | 4/2004 |
| KR | 10-2004-0100122 | 12/2004 |
| KR | 10-2005-0013362 | 2/2005 |
| WO | WO 96/39677 | 12/1996 |

OTHER PUBLICATIONS

Official Action Dated Sep. 30, 2009 From the US Patent and Trademark Re.: U.S. Appl. No. 11/503,193.

* cited by examiner

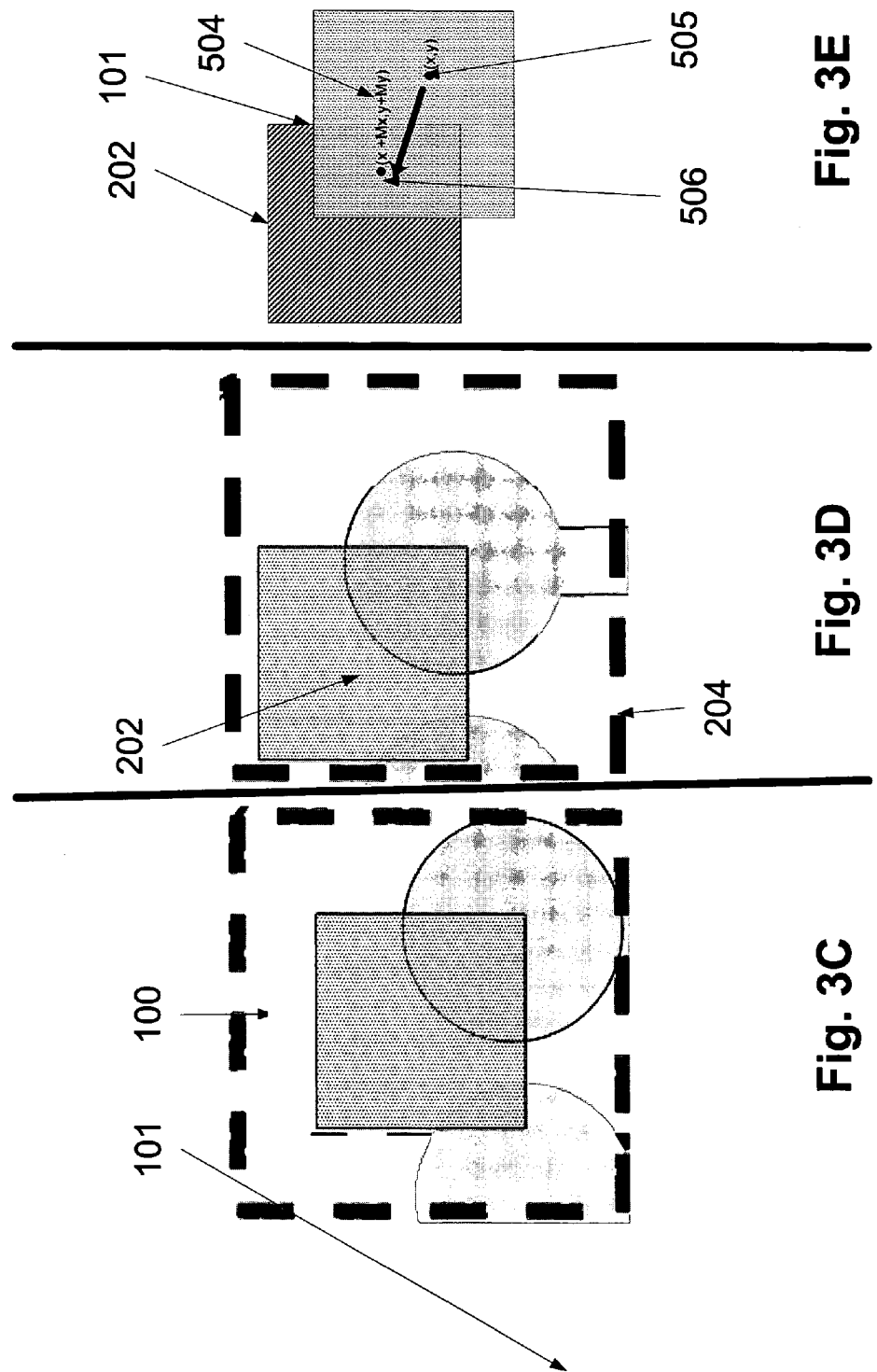

714

713

| Database Segment | Compared Segment | Dot Product |
|---|---|---|
| A1 | C1 | -0.9978 |
| A2 | C2 | -0.8437 |
| A3 | C3 | -0.6613 |
| A4 | C4 | -0.3066 |
| A5 | C5 | 0.6016 |
| A6 | C6 | 0.9824 |
| A7 | C7 | 0.1066 |
| A8 | C8 | -0.4143 |
| A9 | C9 | 0.9928 |
| A10 | C10 | 0.8495 |
| A11 | C11 | -0.1355 |
| A12 | C12 | -0.8768 |
| A13 | C13 | -0.4205 |
| A14 | C14 | 0.2745 |
| A15 | C15 | 0.9807 |
| A16 | C16 | 0.6528 |
| Match Score C vs. A | | 0.7844 |

| Database Segment | Compared Segment | Dot Product |
|---|---|---|
| B1 | C1 | 0.9873 |
| B2 | C2 | 0.9973 |
| B3 | C3 | 1.0000 |
| B4 | C4 | 0.9937 |
| B5 | C5 | 0.9860 |
| B6 | C6 | 0.9998 |
| B7 | C7 | 0.8759 |
| B8 | C8 | -0.8614 |
| B9 | C9 | 0.9995 |
| B10 | C10 | 0.9978 |
| B11 | C11 | 0.7505 |
| B12 | C12 | 0.9322 |
| B13 | C13 | 0.9950 |
| B14 | C14 | 0.9189 |
| B15 | C15 | 0.9731 |
| B16 | C16 | 0.8996 |
| Match Score C vs. B | | 13.4452 |

Fig. 16B

AUTONOMOUS HANDHELD DEVICE HAVING A DRAWING TOOL

RELATED APPLICATIONS

The present application claims the benefit of U.S. Provisional Patent Application No. 60/709,794, filed on Aug. 22, 2005, the contents of which are hereby incorporated in its entirety.

FIELD AND BACKGROUND OF THE INVENTION

The present invention relates to a method and device for allowing users to input directional instructions to a drawing tool application of a portable autonomous device and, more particularly but not exclusively, to a method and device for allowing users to input directional instructions to such an application of a portable autonomous device with limited computational abilities, using movement and gesture detection which is based on image processing.

The rapid miniaturization of complex electronic circuits and the emergence of high-resolution displays have vastly increased the number and variety of portable processor-based devices. Such devices include handheld computers, mobile telephones, pagers and other portable communication and computing solutions. Moreover, processing power, data storage capability, communication speed, and battery life of portable autonomous devices continue to develop at an accelerated pace.

Each one of the aforementioned portable autonomous devices usually integrates a man machine interface (MMI) that allows users to control its functioning. However, the MMI has to be adjusted to the small size of the portable autonomous device. The traditional MMI is a minimized keyboard or a keypad which allows users to input data having textual representation such as a telephone number, a contact name, word processor content, etc. The minimized keyboard or keypad may also be used as a pointing device.

Some portable autonomous devices integrate designated pointing devices in addition to their textual input devices. For example, recently developed mobile phones usually comprise a small joystick or a roller which enables users to operate the portable autonomous devices. Users may control the portable autonomous devices using the pointing devices by making selections on display screens which are connected to the devices. For example, using pointing devices, users can scroll the viewing areas by selecting the vertical or horizontal scroll bars on the display screens.

Another commonly used MMI is the touch screen. Personal digital assistants (PDAs), for example, usually integrate such touch screens and pen-like pointing device which are often stored next to or on the PDAs. In use, a pen-like pointing device is applied to a display area on a PDA to enable a user to make choices and interact with a PDA portable autonomous device. High resolution LCD touch screens may be used in mobile phones and portable devices. The disadvantages of using touch screens are their high price and limited transparency which reduces the picture quality, particularly of modern, high resolution LCD displays.

The rapid miniaturization and cost reduction of complex electronic components has recently led to the integration of image sensors into processor-based portable autonomous devices. PDAs, mobile phones, and laptops integrate cameras which are used to capture still and video images. This has enhanced the marketing potential of mobile phone handsets.

The integration of image sensors additionally allows users to interface with the portable processor-based devices. For example, it is known that outputs of image sensors may be used to calculate the displacement of objects. However, the known methods have several limitations as they rely on certain criteria to track the scene and they may not be reliable, scalable and robust. Accordingly, navigation and display is limited. Furthermore, the functionality achieved is limited making it difficult to control complex operations such as image creation and editing on a handheld device. Thus, these limitations prevent from the processor-based devices to perform certain functions and applications using the displacement detection process.

There is thus a widely recognized need for, and it would be highly advantageous to have, a portable processor-based device that allows users to input directional instructions, devoid of the above limitations

SUMMARY OF THE INVENTION

According to one aspect of the present invention there is provided an autonomous handheld device. The autonomous handheld device comprises a drawing module having drawing capabilities for electronically editing a drawing and a motion sensing feature for sensing self-motion. The autonomous handheld device is configured to associate the motion sensing feature with the drawing capability, thereby to allow sensed motion of the motion sensing feature to modify the electronic editing.

Preferably, the motion sensing feature comprises an image sensor, the motion sensing feature comprises a motion vector detection module adapted to receive digital images captured during a displacement of the autonomous handheld device, the motion vector detection module is configured for generating a current motion vector of the image sensor according to the digital images, wherein the autonomous handheld device configured to modify the electronic editing according to the current motion vector.

Preferably, the autonomous handheld device further comprises a connection to a display device, the drawings is configured to be displayed on the display device.

Preferably, the act of electronically editing comprises members of the group consisting of: drawing a line on the display device, drawing a graphical object on the display device, selecting colors for graphical objects on the display device, selecting line thicknesses for graphical objects on the display device, coloring graphical objects on the display device, changing textures for graphical objects on the display device, and sizing graphical objects on the display device.

Preferably, the autonomous handheld device further comprises an amalgamating module adapted to receive the current motion vector, the amalgamating is configured to amalgamate the current motion vector with a sequence of consecutive motion vectors during the displacement, the drawing module is configured for creating the drawing according to the sequence of consecutive motion vectors.

Preferably, the autonomous handheld device further comprises a movement pattern repository adapted to store a plurality of pattern sample records, each represents a predefined movement pattern, and a movement pattern matching module adapted to match between one of the plurality of pattern sample records and the sequence of consecutive motion vectors. The drawing module is configured for creating the drawing according to the match.

More preferably, the predefined movement pattern is a non-linear movement pattern.

More preferably, the movement pattern matching module is configured to determine according to the match whether the digital images are taken approximately along respective predefined movement pattern.

More preferably, the amalgamating module is adapted to be used for adding a new record to the plurality of pattern sample records; the new record is generated according to the digital images.

More preferably, each one of the plurality of pattern sample records comprises an array of motion vectors.

Preferably, the drawing module is configured to drawing a character on a display device according to the match.

According to one aspect of the present invention there is provided a method for controlling the operation of an autonomous handheld device having display device according to image sensor inputs. The method comprises a) receiving digital images captured by an image sensor during the displacement of the autonomous handheld device, identifying a current movement of the autonomous handheld device according to the digital images, and c) generating a drawing on a display device according to the current movement.

Preferably, the generating of step c) further comprises at least one of the following steps: drawing a graphical object on the display device, selecting colors for graphical objects on the display device, selecting line thicknesses for graphical objects on the display device, coloring graphical objects on the display device, changing textures for graphical objects on the display device, and sizing graphical objects on the display device.

Preferably, the step b) of identifying comprises the following steps: i) receiving a current digital image from the digital images, the current digital image depicting a background scene, ii) choosing the position of a first area within the current digital image, iii) receiving a later digital image from the digital images depicting an overlapping portion of the background scene, iv) identifying the position of a second area matching the first area within the later digital image, the matching is such that the first and second areas depict approximately the same portion of the background scene, and v) calculating a current motion vector of the autonomous handheld device according to a displacement between the first area and the second area, vi) outputting the current motion vector as the current movement.

Preferably the displacement detection method further comprises a step of repeating steps a), b), and c). The repetition may be repeated subsequently.

Preferably, the first area is a quadrilateral area concentric to the first current digital image.

Preferably, the choosing of step ii) is done according to the contrast level of a plurality of potential first areas in the first current digital image.

Preferably the displacement detection method further comprises steps before the step (a) of enabling a portable autonomous device operator to have the ability to input a sensitivity factor, and to adjust the motion vector according to the sensitivity factor.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and device of the present invention involves performing or completing certain selected tasks or steps manually, automatically, or a combination thereof. Moreover, according to actual instrumentation and equipment of preferred embodiments of the method and device of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3C is a portion of the surrounding area which is captured within the reference frame of FIG. 3B;

FIG. 3D is a portion of the surrounding area which is captured within the sample frame of FIG. 3B;

FIG. 3E is a schematic illustration of the deviation between the position of the quadrilateral reference area and the chosen matching area candidate of FIG. 3B;

FIG. 16B depicts two tables, each comprising similarity level values of different pattern sample records in relation to the movement pattern shown in FIG. 8A.

DESCRIPTION OF THE PREFERRED EMBODIMENTS

Figure 1:
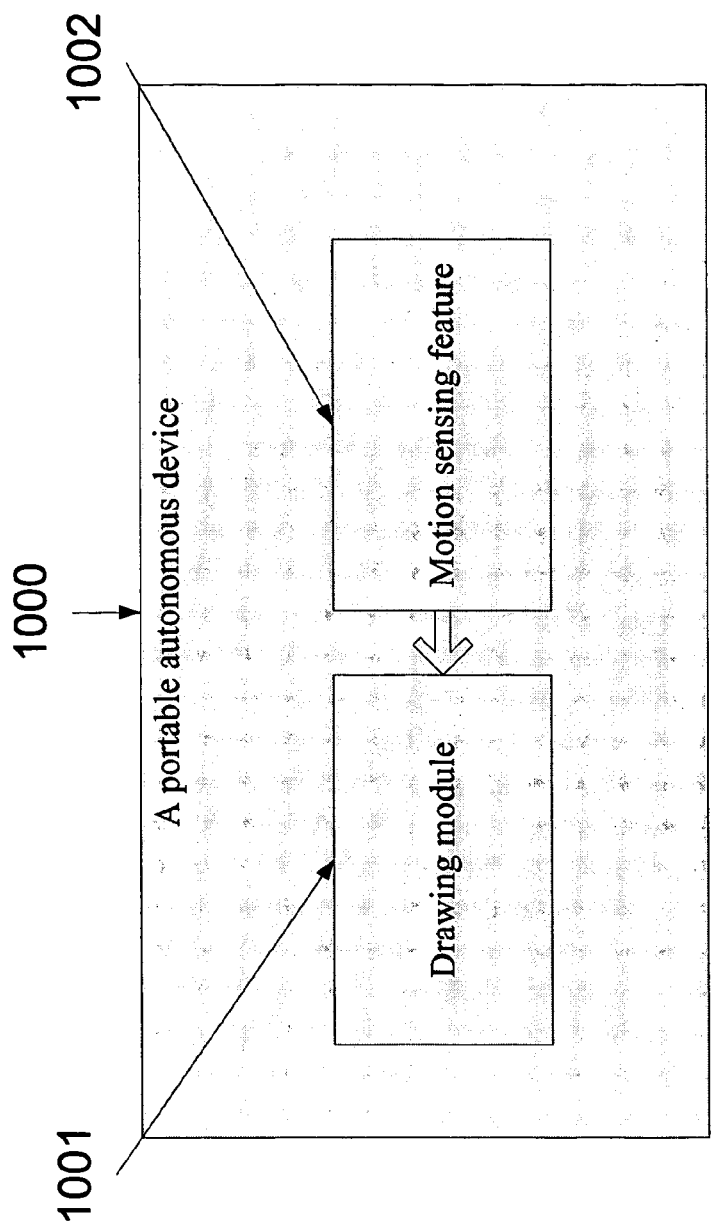
FIG. 1 is a schematic illustration of a device which is configured for detecting and modifying self-motion to electronic editing of drawings, according to a preferred embodiment of present invention.

The present embodiments comprise a device and a method for controlling a drawing application which is hosted on autonomous handheld devices and, more particularly but not exclusively, to a device and a method for using detected motion of the autonomous device, for example from a sequence of digital images, in order to input directional instructions and movement patterns to such an application on an autonomous handheld device with limited computational resources.

The principles and operation of an apparatus and method according to the present invention may be better understood with reference to the drawings and accompanying description. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

One embodiment of the present invention is an autonomous handheld device, such as a mobile phone, having an image sensor. The device is configured to allow a user to create or edit drawings through displacement of the handheld device. The autonomous handheld device comprises a motion vector detection module which edits digital images based on movement capture during a displacement of the image sensor.

In one embodiment of motion detection a motion vector detection module generates a current motion vector of the image sensor according to the captured digital images. The autonomous handheld device further comprises a display device, such as a miniature screen, and a drawing module. The drawing module, which is associated with the motion vector detection module, creates or edits a drawing according to the current motion vector. The drawing may be displayed on the display device during and after editing.

In one embodiment of the present invention, a sequence of motion vectors of the autonomous handheld device is captured and translated to a single graphical object or a character. In such an embodiment, the autonomous handheld device preferably further comprises an amalgamating module which is adapted to receive the current motion vector. The amalgamating module amalgamates the current motion vector with a sequence of consecutive motion vectors during the displacement of the autonomous handheld device. The drawing module creates drawings according to the sequence of consecutive motion vectors. Preferably the autonomous handheld device further comprises a movement pattern repository which stores pattern sample records. Each one of the pattern sample records represents a predefined movement pattern. Such an embodiment allows the autonomous handheld device to match between one of the pattern sample records and the sequence of consecutive motion vectors. A match can be translated to a control signal that activates one of the drawing module functions. For example, the control signal may be translated into a certain graphical object or a certain character which is added to the drawing.

Another embodiment of the present invention is a method for controlling the operation of an autonomous handheld device having a display device, according to image sensor inputs. This method allows a user to edit a drawing by displacing the autonomous handheld device. The method comprises several steps. During the first step digital images which have been captured by an image sensor during the displacement of the autonomous handheld device are received. Then, a current movement pattern of the autonomous handheld device is identified according to the digital images. Based upon the current movement pattern a drawing action is generated and a current drawing is edited or modified.

A portable autonomous device may be understood as any portable processor-based device, inter alia, a mobile phone, a personal digital assistant (PDA), or any other handheld device which integrates a camera or like imaging device.

A control signal may be understood as a stimulus, an input, or a sign which initiates a certain action, such as a signal or interference, that enters a functional unit, such as a telecommunications device, a processor, or a computer program.

A movement pattern may be understood as any movement of an object along a track that approximately or accurately follows an outline. The outline may consist of a certain shape such as a shape of a character, a shape of a sign, a linear shape, a spatial shape, a shape on an object. A movement pattern may be also understood as any movement of an object along a track of a known hand gesture, or a typical movement of the limbs during the performance of a known activity.

A drawing tool and a drawing module may be understood as any hardware or software module to allow users to draw or edit drawings. These drawings can be either black-and-white or color, and can be saved as readable files in different formats such as Bitmap, JPEG, GIF, PNG, TIFF and PDF format, in the memory of the hosting portable autonomous device. The generated drawings may be printed, used as a wallpaper, or pasted into another documents. Preferably, the drawing tool can be used to view and edit images. In the present context the tool is hosted in a portable autonomous device.

Reference is now made to FIG. 1, which depicts a portable autonomous device according to a preferred embodiment of the present invention. Portable autonomous device 1000 comprises a drawing module 1001 and a motion sensing feature 1002. The drawing module 1001 has a number of drawing capabilities for electronically editing a drawing, and may range from the most basic image editing routine to an advanced graphics package. It should be noted that for the sake of conciseness the term 'editing' is used alone hereinafter but 'creating' and 'deleting' are also to be understood mutatis mutandis.

The motion sensing feature 1002 is configured for sensing self-motion of the portable autonomous device 1000. An example for such a feature is described below. The autonomous handheld device 1000 is configured to associate the motion sensing feature 1002 with the drawing capabilities of the drawing module 1001 in a manner that allows the sensed motion to modify the electronic editing of the drawing. Preferably, the portable autonomous device 1000 comprises a user interface which is configured to allow users to initiate and terminate the self-motion sensing of the motion sensing feature 1002. In mobile phones, for example, the capturing may be initiated via a simple set of commands issued by pressing designated keys on the keypad or by pressing a designated button on the housing of the mobile phone. Initiation and termination of the self-motion sensing may be actuated by pressing and releasing a button. Alternatively, a user may press a button to initiate the capturing and press the button again to terminate the capturing.

The detected self-motion is preferably converted to directional or other instructions, as described below in order to operate the drawing module or features thereof. The conversion enables users to control different functionalities of the drawing module. The conversion further enables the user of the portable autonomous device to input, in the same manner, signals that represent different characters or signs, which have been previously defined, as described below.

Figure 2:
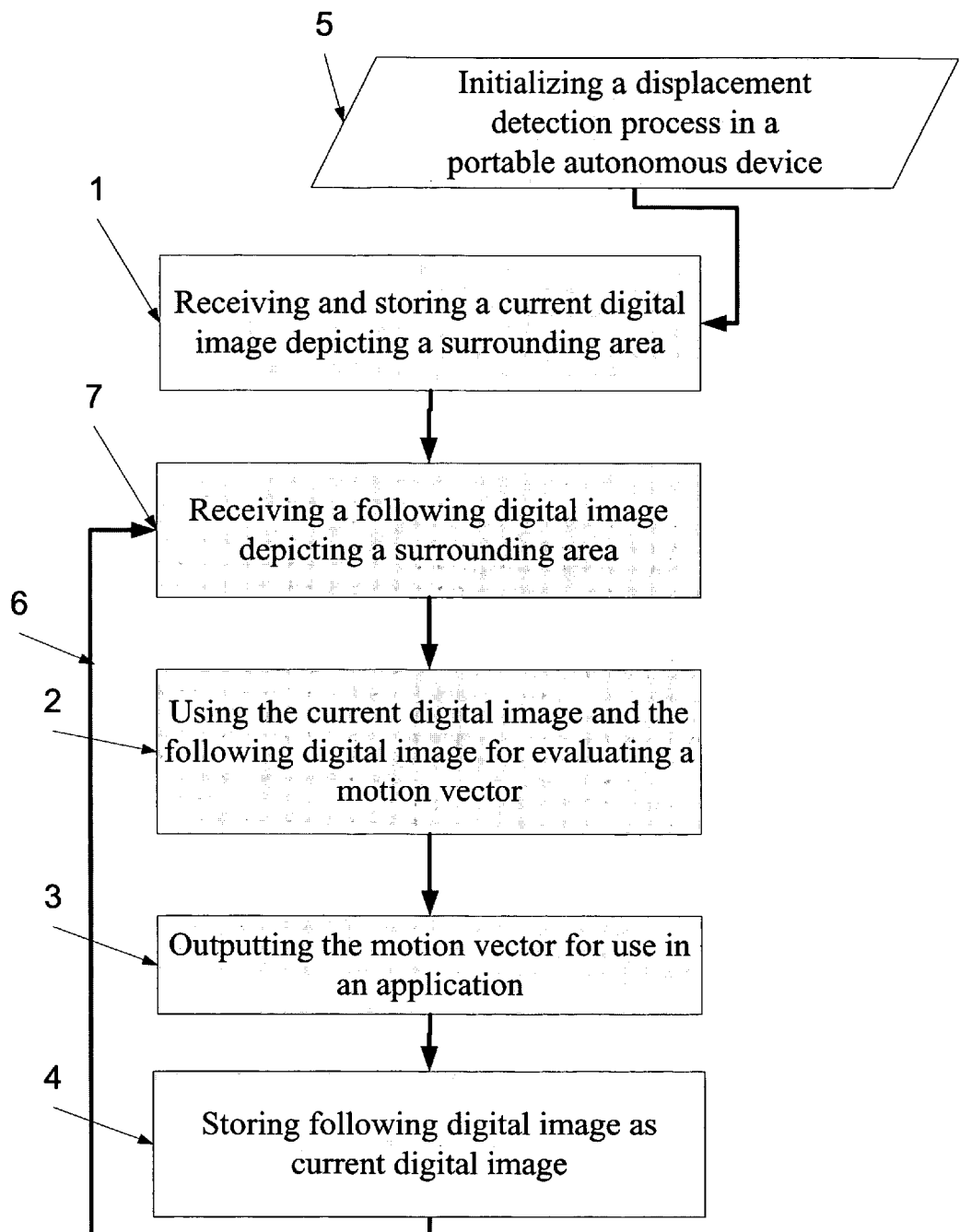
FIG. 2 is a simplified flowchart diagram of a method for object displacement detection, according to a preferred embodiment of the present invention.

Reference is now made to FIG. 2, which is a flowchart that illustrates a method for allowing a user to input directional instructions to a portable autonomous device based on its displacement, according to a preferred embodiment of the present invention. FIG. 2 depicts an iterative four-step displacement detection process which is used to output the real time motion vector of a certain portable autonomous device.

It should be noted that the motion vector can be a result of tilting or displacing the device. Since tilting combines non-linear changes in the perspective of the device, the complexity of the change which is caused by it is theoretically higher than the complexity of the change which is caused by a linear displacement. However, when using some of the embodiments which are described hereinafter, the complexity differences are negligible.

The depicted displacement detection process may be implemented in various portable autonomous devices that integrate one or more image sensors. Preferably, the displacement detection process is integrated via an MMI for portable autonomous devices that already integrate image sensors for other uses.

In one embodiment of the present invention the user may push a designated button or other MMI control in order to initiate the displacement detection process 5. The initiation activates the integrated image sensor. The computing unit of the portable autonomous device receives digital images in real time that depict a captured portion of the surrounding area. It should be noted that each one of the received digital images is probed separately, as described below. During step 1, a first digital image is received and stored as a current digital image. During the following step, as shown at 7, a consecutive digital image is stored as the following digital image. During step 2, the current digital image and following digital image are used for calculating the motion vector of the portable autonomous device. In use, in order to initiate the displacement detection process, two sequential digital images of the surrounding area are captured. The two sequential digital images are used as the basis for calculation of the motion vector. In the subsequent step, at 3, the motion vector is output for use in an application. During the following step, as shown at 4, the following digital image now becomes the current digital image for calculating the motion vector of the portable autonomous device during the following iterative step, shown at 6. The displacement detection process is cyclic and may be used to output the real-time motion vector of a certain portable autonomous device at any given moment.

A more detailed description of the method for displacement detection according to a preferred embodiment of the present invention is as follows: During step 1, the computing unit receives a digital image that depicts a portion of the surrounding area and stores it as a current digital image. The digital image comprises a plurality of pixels, each pixel comprising representational information. Preferably, the representational information describes the local brightness and color of a related portion of the surrounding area within the digital image. Any one of a number of different types of color coordinates may be used to signify the representational information.

Properties of the aforementioned digital image may be enhanced in order to improve the quality of the motion estimation. Such enhancements may include the resizing of the frames and other possible modifications such as brightness and contrast enhancements, as described below.

An image sensor which is usually used to capture such images may capture the image in any known way but typically outputs a digital image in Red-Green-Blue (RGB) color coordinates. However, the image sensor which is used to capture such images may also output a digital image in YCbCr color coordinates, CIE L*a*b* (CIELAB) color coordinates, or any of a variety of other color coordinates, or just simply as gray levels.

Preferably, in order to reduce computational complexity of the motion vector detection, a grayscale digital image is used. Usually, each pixel of grayscale digital images has a single value. The gray level of each pixel of the face segment may be represented using one byte (0-255), the computational complexity of analyzing such a segment is lower than that of analyzing segments which are represented in RGB, HSV, CIELAB, YCbCr or any other color coordinates.

Preferably, in order to allow for a motion vector detection process using grayscale digital images, the method comprises a step of converting the color coordinates of the digital image, preferably RGB, to grayscale color coordinates. The converted color coordinates may also be represented by HSV, CIELAB, YCbCr or any other color coordinates. Preferably, a grayscale digital image is generated by using one of the channels that represent the color digital image as a reference. For example, in RGB color coordinates, the values of the R channel may be used for generating the grayscale digital image.

Preferably, if the original digital image is represented using RGB color coordinates; the values of pixels of the original digital image are converted to generate the grayscale digital image using the following equation:

$$GS=0.3R+0.59G+0.11B$$

Where GS denotes the new grayscale value of the related pixel, R denotes Red, G denotes Green, and B denotes Blue.

In order to improve the motion vector detection, the grayscale digital image may be further processed. Based upon accumulated knowledge, it is known that digital images, captured by some image sensors, do not accurately reflect the brightness level of the captured portion of the surrounding area. The margins of the captured digital image usually tend to represent a brightness level that is less than accurate for the related portion of the surrounding area. A displacement detection process which relies on such inaccurate representation of the illumination of the surrounding area is prone to miscalculation of the motion vector. In order to avoid the miscalculation of the motion vector, a brightness change compensation (BCC) mask may be used.

The BCC mask is used to convert the representational value of pixels of the grayscale digital image pixels. Each pixel is multiplied by a constant multiplicative factor whose value is determined according to the position of the multiplied pixel. Since the brightness level of pixels at the center of the grayscale digital image are preferably not intensified, pixels at the center are multiplied by a constant multiplicative factor which is approximately equal to one. Pixels at the corners of the grayscale digital image tend to suffer most from an undesired decrease in their brightness value. Therefore, pixels at the corners of the grayscale digital image are multiplied by a constant multiplicative factor with a value which is larger than one. Pixels from other areas of the grayscale digital image are multiplied by a constant multiplicative factor which is a derivative of their distance from the center of the grayscale digital image. Preferably, the value of each pixel is converted using the following set of equations:

$$CenterP=1$$

$$CornerP=1+C$$

$$MarP=1+C\cdot[(X-W/2)^2+(Y-H/2)^2]/[(W/2)^2+(H/2)^2]$$

where CenterP denotes the value of a constant multiplicative factor which is used for multiplying pixels at the center of the grayscale digital image, CornerP denotes the value of a constant multiplicative factor which is used for multiplying pixels at the corners of the grayscale digital image, and MarP denotes the value of a constant multiplicative factor which is used for multiplying pixels at other areas of the grayscale digital image. C denotes a constant factor; (X, Y) denotes the coordinates of the pixel at the grayscale digital image; and W and H denote the width and the height of the grayscale digital image, respectively. Preferably, C is equal to 0.41.

Preferably, in order to reduce the computational complexity of multiplying the pixels of the digital image and the BCC mask during the calculation of the motion vector, the constant multiplicative factor for each pixel is calculated beforehand and stored in a predefined matrix.

As depicted at step 2, the motion vector of the portable autonomous device is estimated. The estimation is calculated on the basis of two sequential grayscale digital images which are obtained. An earlier digital image is used as a reference frame and a later digital image is used as a sample frame.

Figure 3A:
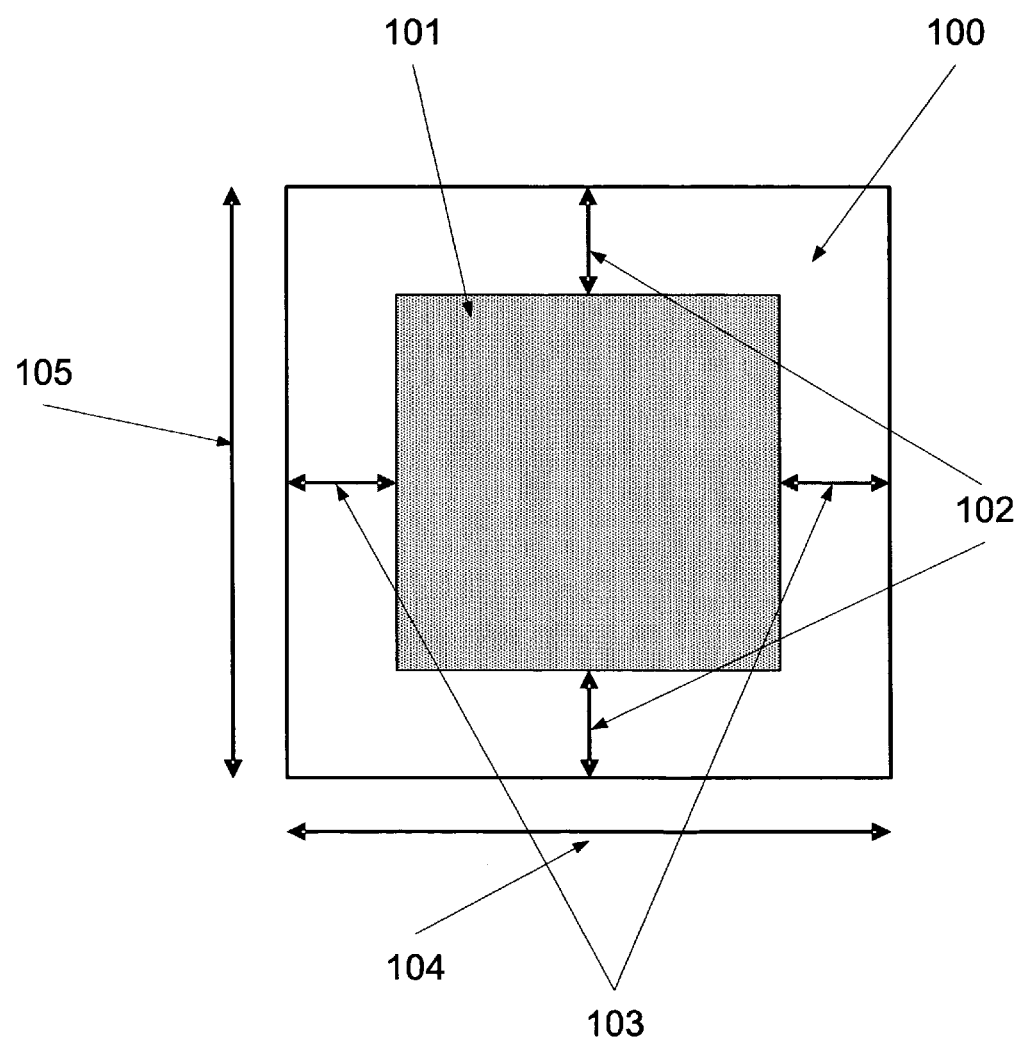
FIG. 3A is a reference frame and a quadrilateral reference area, according to one embodiment of the present invention.

Reference is now made to FIG. 3A which depicts a reference frame 100 and a quadrilateral reference area 101, according to an embodiment of the present invention. The motion vector of the portable autonomous device is calculated based on the differences between the position of a reference area within the reference frame and a matching area which is identified within the sample frame. The matching area is chosen according to correlation values which represent the similarity level between a reference area within the reference frame and matching area candidates within the sample frame. The position of each matching area candidate reflects a possible change in the position of the portable autonomous device. Based on the differences between the position of the reference area and the position of the matching area, a motion vector that represents the movement of the portable autonomous device is calculated, as described below. The motion vector may then be passed on for use by an application of the portable autonomous device. Accordingly, a user can maneuver the portable autonomous device in order to control different applications of the portable autonomous device.

In order to calculate the correlation values, a portion of the surrounding area which is represented by the reference area has to reappear in the sample frame. However, if the portion of the surrounding area which is captured by the reference frame is at the margins thereof 102, 103, the movement of the portable autonomous device may lead to that portion of the surrounding area being absent from the sample frame. Thus, the width of the margins defines the maximal shift between every two consecutive frames that can be detected. By using pixels from the quadrilateral reference area 101 one can ensure that they reappear in the following image, as long as the movement between the frames is not larger than the maximal shift.

In one embodiment of the present invention, a quadrilateral reference area 101 is defined in the center of the reference frame 100. Preferably, the quadrilateral reference area 101 is smaller than the reference frame 100 and is positioned in the center thereof. The quadrilateral reference area 101 is used as a reference area which is matched with matching area candidates from the sample frame. A portion of the surrounding area which is captured within the boundaries of quadrilateral reference area 101 has a higher probability of reappearing in the sample frame than does a portion of the surrounding area which is captured within the margins of reference frame 100. Preferably, the length of the quadrilateral reference area 101 is predefined. Preferably, the ratio of the length of the reference frame 104, 105 to the length of the margins 102,103 is between 1:0.125 and 1:0.375. As described above, after a quadrilateral reference area 101 has been defined, a matching area having the same dimensions is determined within the boundaries of the sample frame.

Reference is now made to FIGS. 3B, 3C, 3D and 3E which depict a surrounding area which is partly captured and depicted by a reference frame 100 and by a sample frame 204. The reference frame 100 and the quadrilateral reference area 101 are similar to those shown in FIG. 3A above. However, FIGS. 3B-D further depicts a sample frame 204, a matching area candidate 202, and a set of captured objects according to a preferred embodiment of the present invention.

As shown at step 2 of FIG. 2, the current digital image and following digital images are used for calculating the motion vector of the portable autonomous device 501. Preferably, as depicted above, the chosen matching area candidate 202 which is captured in the current digital image depicts a portion of the surrounding area which is similar to the portion of the surrounding area which was captured in the previous digital image depicted by the quadrilateral reference area 101. The motion vector of the portable autonomous device is calculated based on a deviation between the position of the quadrilateral reference area 101 and the matching area candidate of the sample frame.

Figure 3B:
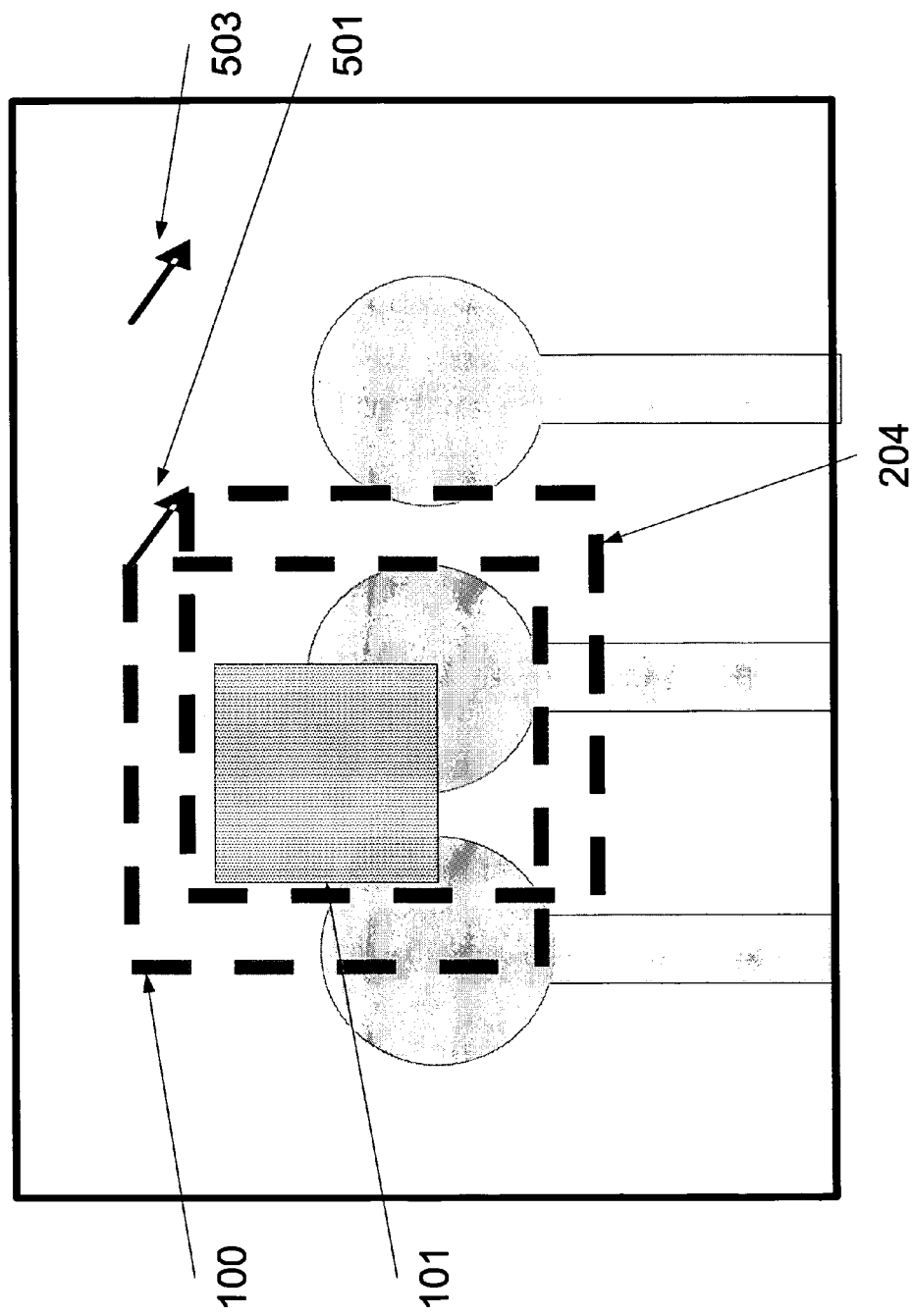
FIG. 3B is a reference frame and a sample frame which are captured by a portable autonomous device in a certain surrounding area.

FIG. 3B depicts a reference frame 100 and a sample frame 204 which are captured by a portable autonomous device whose direction of movement is shown at numeral 503. FIG. 3C depicts the portion of the surrounding area which is captured in the reference frame 100. FIG. 3D depicts the portion of the surrounding area which is captured within the sample frame 204.

Both the reference frame 100 and the sample frame 204 originate from the same sequence of digital images. The frames have the same dimensions and can be referenced using the same coordinate system. Preferably, a coordinate system with an origin at the upper-lefthand corner of the frames is used.

As depicted in FIG. 3C and FIG. 3D the quadrilateral reference area 101 and the chosen matching area candidate 202 are positioned at different coordinates in relation to the origin of the coordinate system used. FIG. 3E depicts the deviation 504 between the position of the quadrilateral reference area 101 and the chosen matching area candidate 202. The deviation 504 reflects a motion vector which is opposite to the direction of movement of the portable autonomous device. Preferably, the deviation is represented as a set of two numbers (i.e., Mx, and My) that represent the difference between the coordinates of a certain pixel 505 that represents a certain portion of the surrounding area in the reference frame 100 and a corresponding pixel 506 that represents the same portion of the surrounding area in the sample frame 204.

Preferably, the motion vector calculated for the portable autonomous device is the inverse of the vector which represents the deviation between the reference area 101 and the chosen matching area candidate 202.

As shown at step 3 of FIG. 2, the motion vector is used in an application of the portable autonomous device. By using such a motion vector, a user may displace the portable autonomous device to generate directional instructions to one or more of the applications of the portable autonomous device. The displacement detection process uses the detected movement of the portable autonomous device to determine a motion vector which is interpreted as directional instructions. The directional instructions may be correlated to the displacement of a cursor image on a display screen associated with the portable autonomous device. The display screen may be used to display a virtual blackboard for allowing the user to perceive his drawing during the generation process, as further described below.

Preferably, the calculated motion vector of the portable autonomous device reflects the shifting of the portable autonomous device in a two dimensional plane which is parallel to the image sensor.

In one embodiment of the present invention, the output motion vector is a spatial motion vector that reflects the shifting of the portable autonomous device in a three dimensional space. In order to generate a spatial motion vector, at least two image sensors which are coupled to the portable autonomous device in an unparallel manner are used. Each one of the image sensors is used, as described above, to generate a linear motion vector that reflects the shifting of the portable autonomous device in a two dimensional plane. Since the linear motion vectors are positioned in different, nonparallel planes, the generated linear motion vectors differ one from another and respectively reflect the motion of the device in different, nonparallel planes. Preferably, the spatial motion vector of the device $((x', y', z')$ is determined by combining the two linear motion vectors $((x', y')$ and $(x', z')$ that represent the motion of the portable autonomous device in two nonparallel planes. It should be noted that each of two linear motion vectors comprises information about the motion of the portable autonomous device along an axis (X, Y or Z). Therefore, a spatial motion vector that reflects the shifting of the portable autonomous device in a three dimensional space can be easily calculated. Preferably, the two image sensors are positioned on the surface of the portable autonomous device in a manner such that they are perpendicular to each other. The calculation of a spatial motion vector of an object based upon two motion vectors that reflect its movement in two different planes is generally well known and therefore is not described here in greater detail.

In one embodiment of the present invention the motion vector is multiplied by a sensitivity factor. The sensitivity factor is used to either intensify or to attenuate the influence of the motion of the portable autonomous device on the application.

Figure 4:
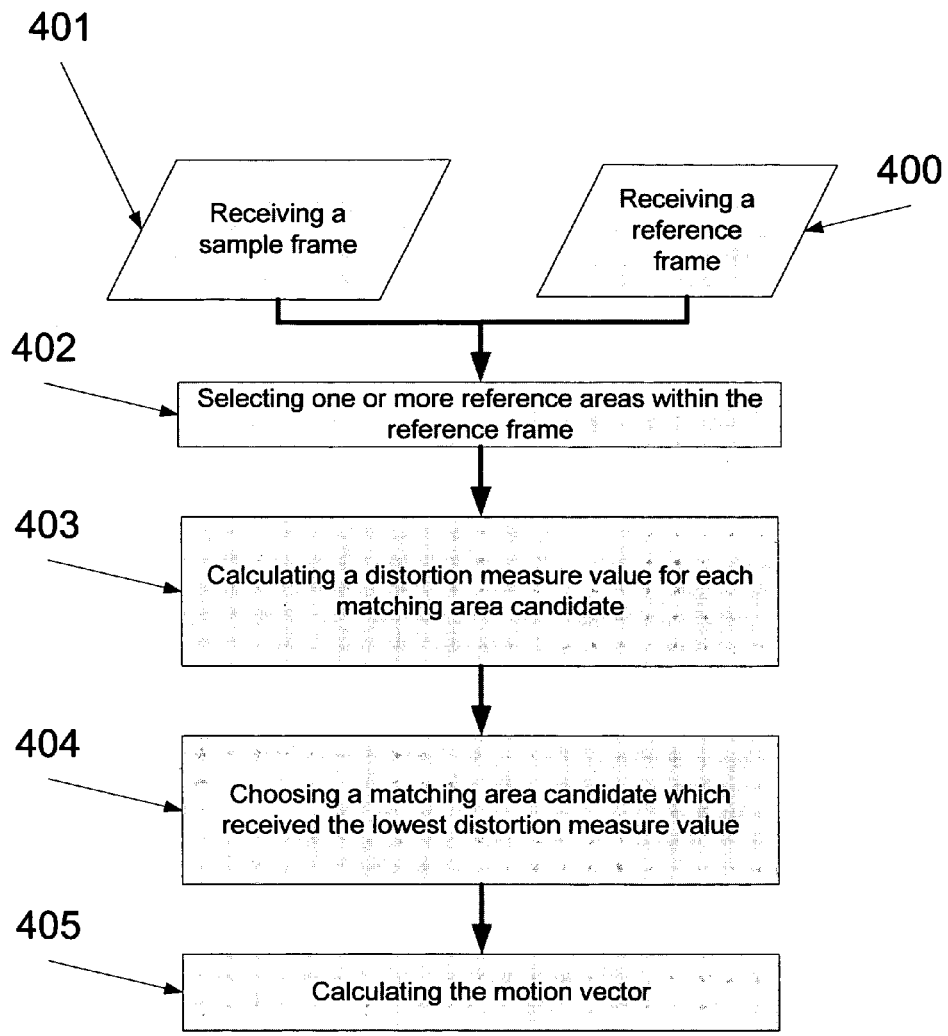
FIG. 4 is a simplified flowchart diagram of an exemplary block matching process, according to a preferred embodiment of the present invention.

Reference is now made to FIG. 4, which is a flowchart of an exemplary block matching process, according to a preferred embodiment of the present invention. As shown at step 3 of FIG. 2, the motion vector of the portable autonomous device is output for use in an application of the portable autonomous device. In order to calculate the motion vector, a matching area within the sample frame has to be identified.

In one embodiment of the present invention, a block matching process is used to choose a matching area within the sample frame. Preferably, a sum of absolute differences (SAD) process is used. The SAD process is used to quantify the similarity between the quadrilateral reference area 101 and different matching area candidates within the sample frame. The outcome of quantification is used to determine the matching area.

In FIG. 4, during the first step, as described above and shown at 400 and 401, a reference frame and a sample frame are received. Subsequently, as shown at 402, at least one reference area is defined within the boundaries of the reference frame. Preferably, the area is defined within the boundaries of the aforementioned quadrilateral reference area. Then, as shown at 403, the SAD process evaluates a distortion measure of the matching area candidates. The distortion measure reflects the level of similarity between the related matching area candidate and the reference area. Preferably, the algorithm of the SAD process which is used to evaluate the distortion measure between a certain matching area candidate and the reference area is defined according to the following equation:

$$SAD(B_{cur}, B_{ref}) = \sum_{j=1}^{Pl} \sum_{i=1}^{Pw} |B_{cur}(i, j) - B_{ref}(i, j)|$$

Where $B_{ref}$ denotes the reference area, $B_{cur}$ denotes the matching area candidate, (i, j) denotes the coordinates of the matched pixel, and Pw and Pl respectively denote the number of pixels along the width and the length of the matched frames. During each iteration of the SAD process, a correlation value is determined by calculating the difference between the value of a pixel at the reference area $B_{cur}(i,j)$ and a respective pixel at the matching area candidate $B_{cur}$ (i, j). The outcome of the SAD process is a sum of the calculated correlation values of all the pixels.

The depicted algorithm is used to calculate the distortion measure value of all the matching area candidates. As shown at 404, only after each of the matching area candidates has been either evaluated using the SAD process or identified as not suitable as a matching area, as described below, is the matching area candidate with the lowest distortion measure chosen.

If L and W are the margin sizes (102,103 in FIG. 2), a total of (2L+1)·(2W+1) different matching area candidates have to be evaluated. With regard to the size of the reference area, such a comprehensive matching process may have a high computational complexity that demands a substantial amount of computational resources. Such resources are not always available in portable autonomous devices such as mobile telephones and other handheld devices. In order to reduce the necessary amount of computational resources, the matching process has to be optimized. A few methods are available to allow optimization by early identification and removal of matching area candidates which are not suitable as matching areas.

In one embodiment of the present invention, the lowest distortion measure is stored as a current lowest distortion measure. This information may be used during the SAD process in order to reduce computational complexity. As described above, the distortion measure is a sum of the remainders of the subtraction between pixels of the reference frame ($B_{ref}$) and pixels of the matching area candidate ($B_{cur}$). The current lowest distortion measure may be used as a maximum threshold. During the SAD process, the sum of the remainders is compared with the current lowest distortion measure. If the sum exceeds the current lowest distortion measure, the SAD process stops and the related matching area candidate is identified as unsuitable. Clearly, if the current sum exceeds the current lowest distortion measure which has been calculated for a previous matching area candidate, the current matching area candidate cannot be chosen as having a higher distortion measure. The sum of the remainders may be matched with the current distortion measure in any stage of the SAD process in order to reduce its computational complexity.

Figure 5:
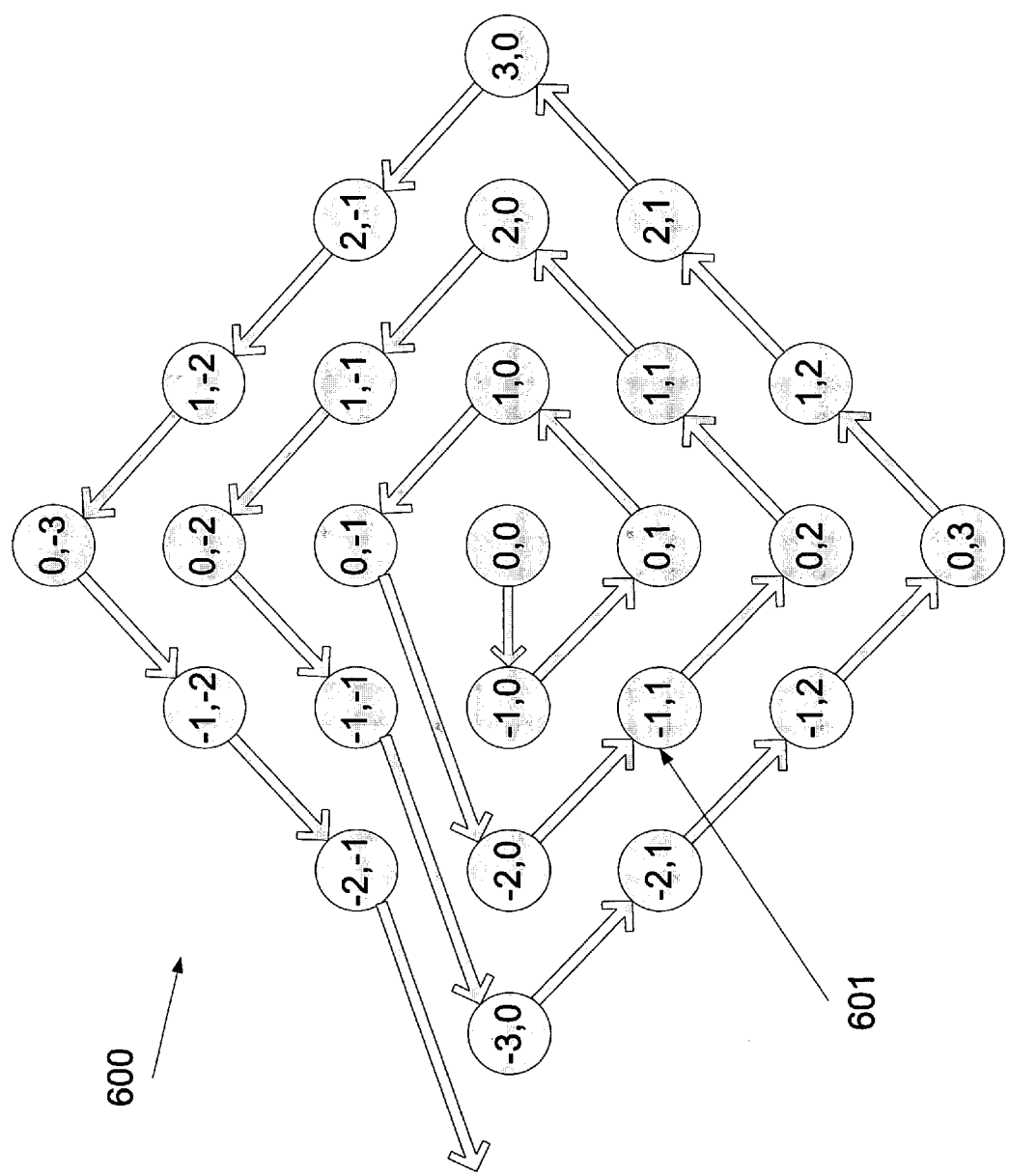
FIG. 5 depicts a helical search track for determining the order in which matching area candidates are matched, according to a preferred embodiment of the present invention.

Reference is now made to FIG. 5 which depicts a helical search track 600 for determining the order in which matching area candidates are matched, according to a preferred embodiment of the present invention. As described above, a total of (2L+1)·(2W+1) different matching area candidates have to be either evaluated using the SAD process or identified as unsuitable before a matching area is found. Clearly, identifying a matching area candidate as unsuitable before it is fully matched reduces the computational complexity of the SAD process. As described above, the early identification is based on information regarding the current lowest distortion measure. Thus, if the lowest distortion measure is identified at an early stage of the matching process, more matching area candidates may be identified as unsuitable before they are fully matched with the reference area.

In order to proceed with the identification of the matching area candidate with the lowest distortion measure, a helical search track 600 is used. It is assumed, based upon experimental data, that the matching area is usually positioned in the proximity of the reference area. Accordingly, in order to proceed with the identification of the matching area candidate, the adjacent matching area candidates are preferably matched before the nonadjacent matching area candidates are matched. Preferably, a helical search track 600 is used to determine the order in which the matching area candidates are to be matched with the reference area. Each node, for example, node 601, of the helical search track 600 comprises the deviation between the coordinates of the reference area and those of the matching area candidate. For example, if the coordinates of the upper lefthand pixel of the reference area are (x, y), the coordinates of the upper lefthand pixel of the matching area candidate which is matched sixth is (x−1, y−1), as shown at 601. Such a search track ensures that the closer matching area candidates are matched before the more distant matching area candidates are matched.

Reference is now made, once again, to FIG. 4. As shown at 405, the chosen matching area candidate is used for calculating the motion vector of the portable autonomous device, as discussed above. The motion vector detection process is cyclic and is configured to output the motion vector of the portable autonomous device at any given moment.

As described above, a given sample frame which is used during a certain iteration of the SAD process is used as the reference frame in the subsequent iteration of the SAD process.

Figure 6A:
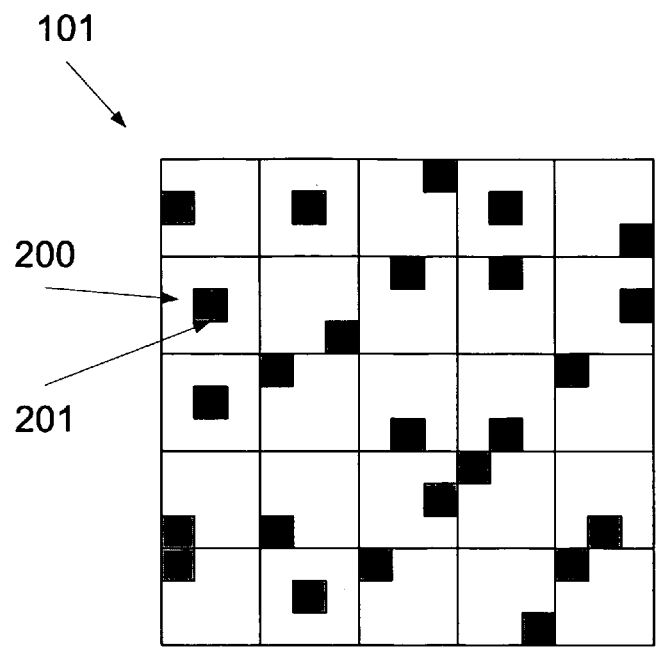
FIG. 6A is a reference frame having a quadrilateral reference area which is divided into regions having regional pivots.
Figure 6B:
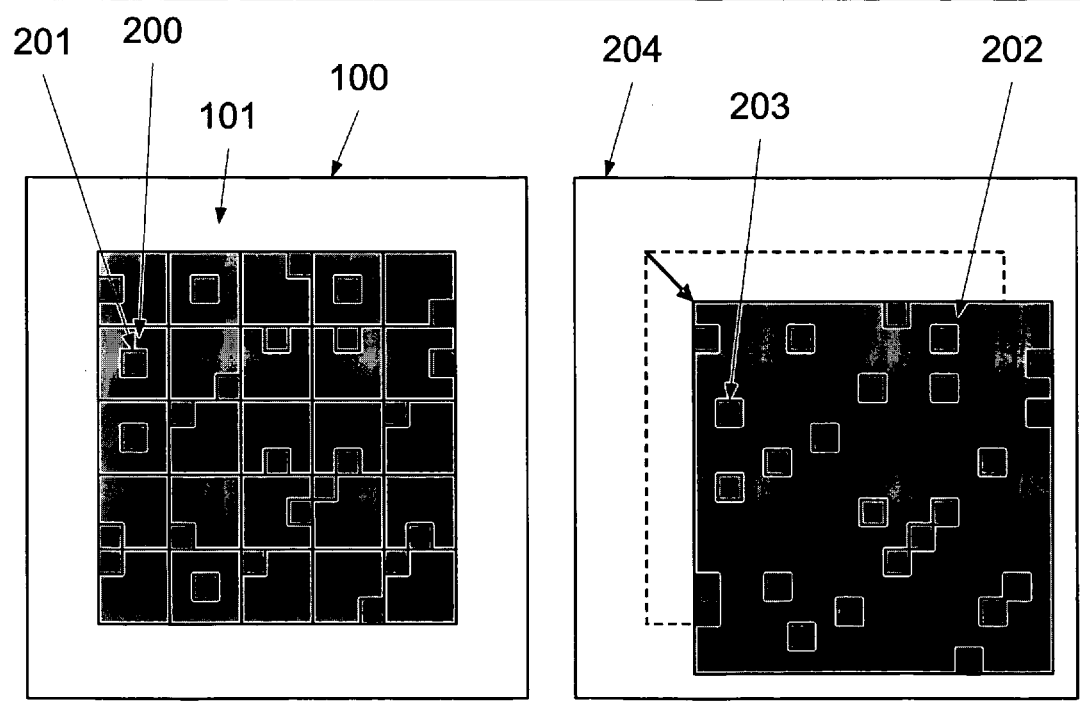
FIG. 6B is a reference frame having a quadrilateral reference area and a sample frame with an exemplary matching area candidate which has been generated in respect to the quadrilateral reference area, according to a preferred embodiment of the present invention.

Reference is now made to FIGS. 6A and 6B which depict a reference frame 100 having a quadrilateral reference area 101 which is divided into regions 200 having regional pivots 201 and an exemplary matching area candidate 202 of the sample frame 204 which is divided in a similar manner. The reference frame 100 and quadrilateral reference area 101 are similar to those shown in FIG. 3A above. However, FIGS. 6A-B further depicts regions 200 and pivots 201 according to a preferred embodiment of the present invention.

In one embodiment of the present invention, a regional pivot matching process is used to reduce the computational complexity of the SAD process. As shown at step 402 of FIG. 4, at least one reference area within the reference frame is chosen to be matched with a respective area in the sample frame. In order to reduce the high computational complexity of probing all the pixels of the matching area candidates, a set of pivots is chosen as a base for a comparison. Preferably, as depicted in FIG. 6A, the quadrilateral reference area 101 is divided into a number of regions. The number of regions is preferably a derivative of the frame size. Each region preferably has the same size and shape. A regional pivot 201 is selected within the boundaries of each region 200. Preferably, the regional pivot is 16 pixels (4 by 4) square. By using the regional pivot matching process only, the correlation values of pixels of the regional pivots are calculated and summed during the SAD process. It should be noted that reducing the region size increases the accuracy of the process result but also its computational complexity. Therefore, the size of the region may be determined with respect to the device's CPU usage and abilities.

FIG. 6B depicts the reference frame 100, the quadrilateral reference area 101, and a sample frame 204 with a matching area candidate 202 which has been generated in respect to the quadrilateral reference area 101. A set of regional pivots 203 is defined to cover only a limited area of the matching area candidate. By defining the regional pivots 201 and the set of regional pivots 203, the correlation values of related pixels may be calculated in a relatively short time. The reduction in the number of the matched pixels substantially decreases the computational complexity of the matching process.

Figure 7A:
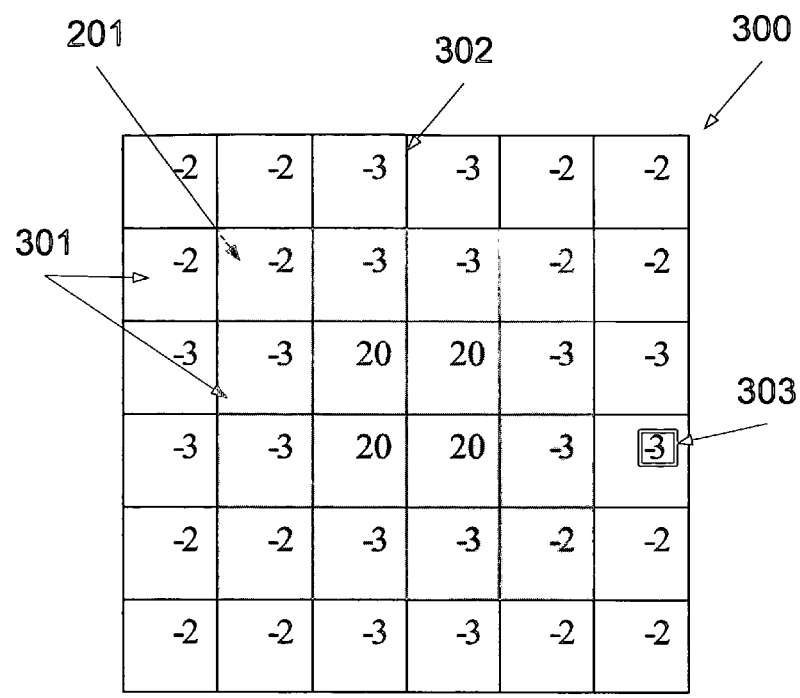
FIG. 7A is a mask which is configured to multiply values of pixels of a regional pivot and an encircling strip of pixels.
Figure 7B:
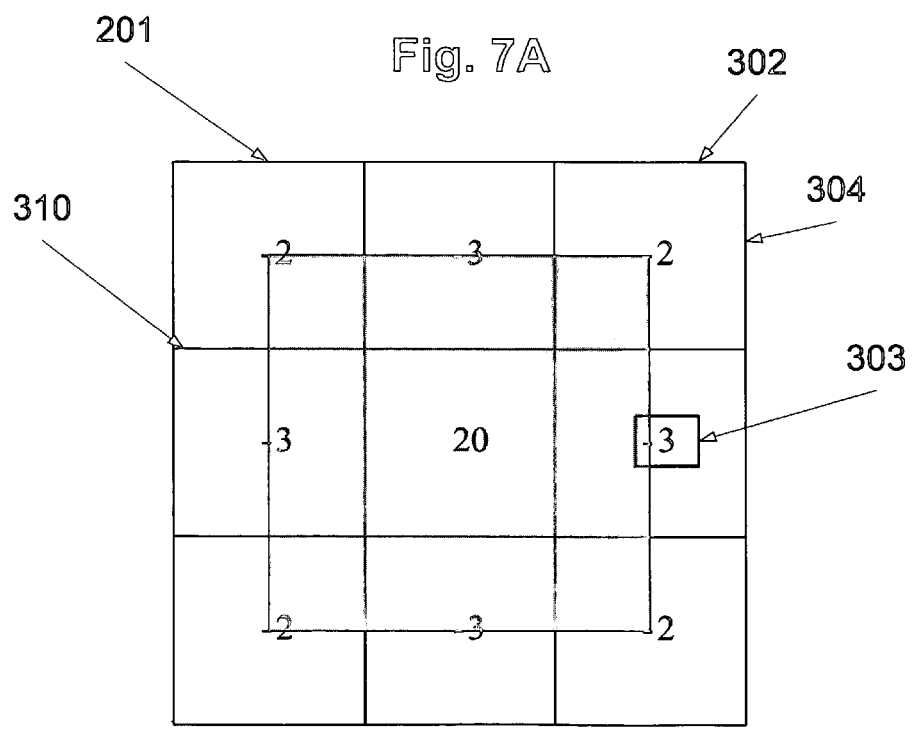
FIG. 7B is another mask which is configured to multiply values of pixels of a regional pivot and an encircling strip of pixels.

Reference is now made to FIGS. 7A and 7B which depict respective masks 300 and 310 which are configured to multiply values of pixels of a regional pivot 201 and an encircling strip of pixels 302. The regional pivot 201 is similar to that shown in FIG. 6A above. However, FIG. 7A further depicts squares 301 that represent constant factors according to a preferred embodiment of the present invention.

As described above, the regional pivot matching process substantially reduces the computational complexity of the SAD process. However, using regional pivots with a limited number of pixels may not always result in reliable outcomes.

For example, when the pixels of the regional pivot represent a portion of a digital image which depicts a uniform pattern, it comprises pixels with a certain value. If a portion that represents a uniform pattern covers pixels which are adjacent to the regional pivot, more than one matching area candidate may comprise pixels that represent the same uniform pattern. As described above, the outcome of the SAD process depends on the pattern of the matched block. Thus, when such matching area candidates are matched, the SAD process produces the same low distortion measure. Clearly, in this case, the SAD process cannot be used to identify a matching area, and the motion vector of the portable autonomous device cannot be calculated.

In order to assure the quality of the regional pivot matching process, a regional pivot selection process is performed. The regional pivot selection process is used to identify a regional pivot 201 which is positioned in a relativity nonuniform area of a certain region. By avoiding, as much as possible, choosing regional pivots from portions of the surrounding area that have uniform patterns, the regional pivot selection process increases the accuracy of the regional pivot matching process. Preferably the used mask is divided into 36 (6 by 6) equal squares 301. Each square 301 represents a different constant multiplicative factor 303. Each constant multiplicative factor 303 is used to multiply the value of a related pixel. Preferably, the constant multiplicative factors 303 at the center of the mask have positive values, while other constant multiplicative factors 303 have negative values. The sum of all the constant multiplicative factors is preferably zero.

During the pivot selection process, each regional pivot 201 is evaluated using the mask 300. The value of each of the pixels of the regional pivot 201 adjacent the center and of each of the pixels 302 which encircle the regional pivot is multiplied by a respective constant factor 303. The sum of all the products reflects, in an inverse proportion, the uniformity level of the pattern of the related portion of the surrounding area. The higher the absolute value of the sum, the lower will be the uniformity level.

If the pattern is uniform and the value of the pixels within the mask has an identical or similar value, the sum of the all products is zero or approximately zero. This outcome is achieved since, as described above, the sum of all the respective constant factors in the negative and the positive areas 303 is zero. The center of the mask and the margins of the mask have opposite values. Thus, if the values of the pixels within the mask are plotted in a nonuniform manner, the absolute value of the sum of all the products is relatively large. The larger the difference between the values of pixels at the positive center of the mask and the negative margins of the mask, the higher the absolute value of the sum of all the products. Preferably, the absolute value of the sum of all the products is stored as a pivot suitability rank that reflects the appropriateness of the probed potential regional pivot.

In use, the products of the values of pixels of each potential regional pivot are summed and the regional pivot that has the highest pivot suitability rank of all products is chosen as the regional pivot. Such an embodiment ensures that the selected regional pivot is positioned at an area that has a low uniformity level in relation to other potential regional pivots within the related region. In one embodiment of the present invention, the pivot's uniformity level is stored as a pivot suitability rank. Preferably, the suitability rank is stored in an inverse proportion to the uniformity level. Preferably, the pivot suitability ranks of the different chosen regional pivots may be used to determine the order of the regional pivot matching process. As shown at step 403 of FIG. 4, after the regional pivots have been chosen as reference areas in the reference frame, the distortion measure value for each matching area candidate is calculated. As described above, the current lowest distortion measure may be calculated and stored during the SAD process. In order to reduce computational complexity, the distortion measure value calculation may be halted during the calculation process. If the calculated distortion measure value exceeds the current lowest distortion measure, the calculation process may be halted and the distortion value of the next matching area candidate may be calculated. As described above, regional pivots with high suitability rank have a relatively nonuniform pattern. As such, regional pivots of matching area candidates which do not match with the reference area may have high correlation values. Thus, such regional pivots have a higher potential to influence the distortion measure value of the matching area candidate than do pivots with a low suitability rank. Thus, by summing the values of pivots with a high suitability rank before pivots with a low suitability rank, unsuitable matching area candidates are presumably identified in a relativity short time. Accordingly, in one embodiment of the present invention, the order of addition of regional pivots is determined according to the regional pivot suitability rank. The regional pivots are placed in descending order according to their suitability rank, and the correlation values of their pixels are added to the sum.

As described above, during the regional pivot selection process, the value of each pixel of each potential regional pivot is multiplied by a respective value of the mask before it is added to the sum.

FIG. 7B depicts a mask 310, according to one embodiment of the present invention, which is used in order to reduce the computational complexity of the regional pivot selection process. By using such a mask, the values of pixels of the reference area are added to a temporary sum before they are multiplied by values of the mask. The outcomes of the temporary sums are added to the distortion measure sum. As depicted in FIG. 7B, the mask 310 is divided into groups 304 of pixels, preferably four. Pixels in each group are multiplied by the same constant multiplicative factor 303. Preferably, the pixels of each group are arranged in a square like group 304. All the pixels in each group are summed and only that number is multiplied by a related constant multiplicative factor 303. The temporary sums are then summed to reflect the uniformity level of the mask, as described above. Clearly, such an embodiment reduces the number of mathematical operations by cutting down the number of pixel multiplications.

Reference is now made, once again, to FIG. 4. After the set of regional pivots has been chosen and defined at the matching area at step 402, the distortion measure value for each matching area candidate may be calculated, as shown at step 403. Since the matched area is limited, the computational complexity of the distortion measure value calculation is relatively low. The matching area candidate with the lowest distortion measure value is easily chosen, at step 404, and the motion vector is calculated, at step 405.

The reliability of output motion vectors is not constant. As described above, a relatively unreliable output may be produced when the captured surrounding areas have a uniform pattern. The regional pivot selection process cannot completely achieve the effect of uniform patterns on the quality of the displacement detection process. For example, if a uniform pattern completely covers one or more regions, the values of pixels of any regional pivot of the region are summed to approximately the same undesirable outcome. Matching between matching area candidates and a reference area which comprises pixels that depict the same uniform surface cannot provide the needed information for generating a reliable motion vector.

In one embodiment of the present invention, for each output motion vector, a quality level is calculated. The quality level is based upon the distortion measure of each surface of the matching area candidates. When the reference and sample frames depict a relatively large portion of a nonuniform surface, the distortion measures of most of the matching area candidates is high. As described above, the quality level is an outcome of high correlation values which are calculated during the SAD process. However, when the captured images depict relatively large uniform surfaces, the distortion measures of most of the matching area candidates are relatively low. Preferably, the quality level of a certain motion vector is a sum of all the distortion measures of related matching area candidates. The higher the sum, the higher will be the motion vector's quality level.

Evaluating the quality level of the motion vector may be substantially beneficial for some applications. For example, one or more thresholds may be predefined in order to determine, during the displacement detection process, whether to use or to ignore the generated motion vector. In another embodiment, the quality level may be used to determine whether or not to inform the operator of the portable autonomous device as to the reliability of the motion vector. Preferably, a voice or a visual message indicating the quality level of the motion vector is presented to the operator. An example for the visual message may be a blinking display or a text message.

Another use for the quality of level of the motion vector is based on the assumption that usually each movement of the portable autonomous device is represented by a series of similar and sequential motion vectors. Thus, it is assumed that the probability that the current motion vector of the portable autonomous device is identical to the previous motion vector is high. Preferably, a quality level reduction instructs the portable autonomous device to use a previous motion vector as the current motion vector. Preferably, motion vectors are stored for one or more iteration. If the quality level decreases below a predefined threshold, a previously calculated motion vector is output as the current motion vector. Such an embodiment may be beneficial in order to overcome only short miscalculations, preferably of a few deciseconds long, which are caused by analyzing a sequence of digital images which depict uniform surfaces.

Figure 8:
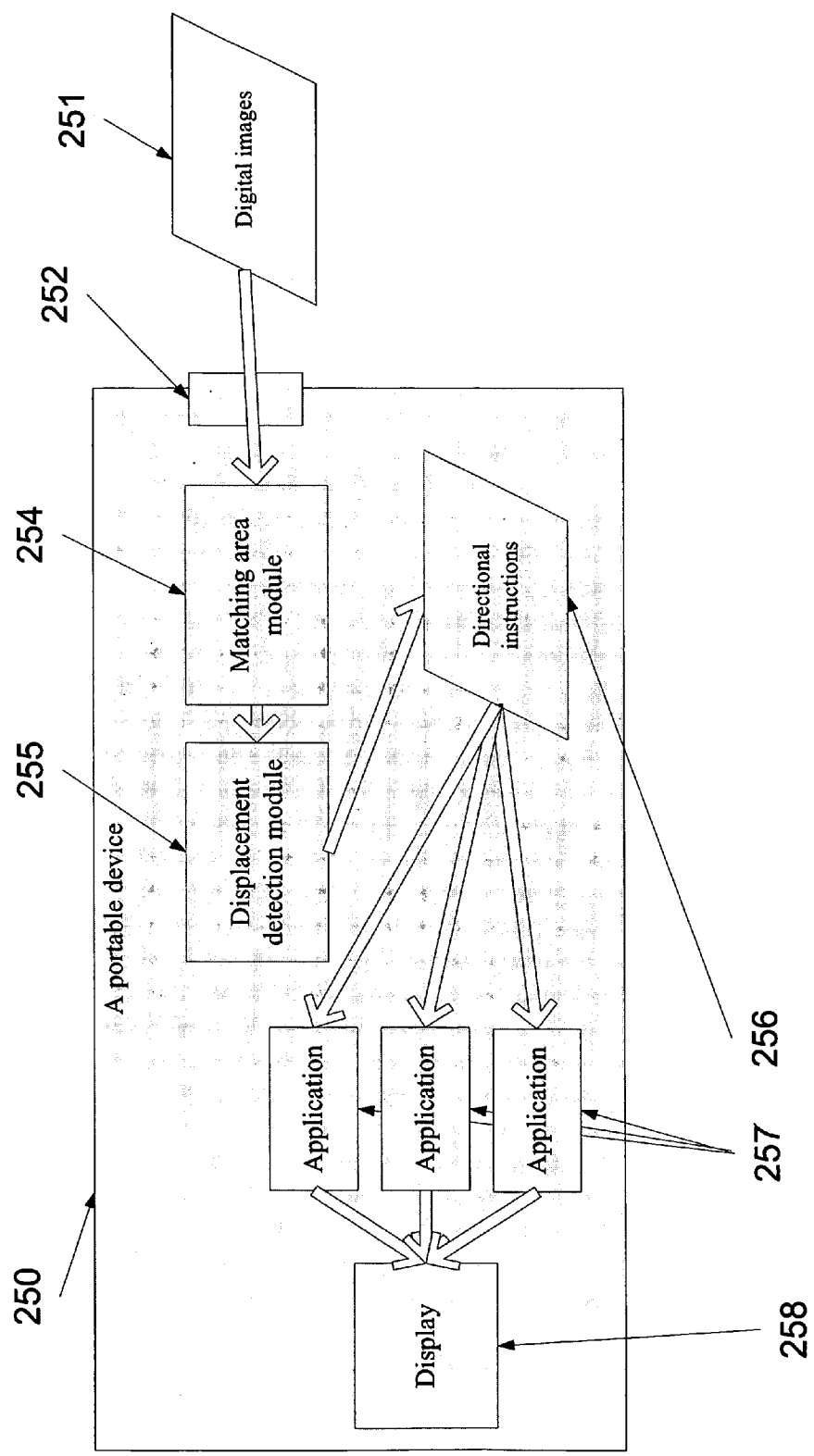
FIG. 8 is a schematic illustration of a portable autonomous device having an image sensor for enabling users to input directional instructions, according to a preferred embodiment of present invention.

Reference is now made to FIG. 8 which depicts a portable autonomous device with a displacement detection module, according to a preferred embodiment of the present invention. The portable autonomous device 250 is adapted to receive in real time digital images 251 from an image sensor via a designated image input module 252. The received digital images 251 originate from an image sensor, which may be a complementary metal oxide semiconductor (CMOS) sensor or a charged coupled portable autonomous device (CCD) sensor.

The digital image is transferred to a matching area module 254 which is used to choose the position of the reference area within the boundaries of the reference frame typically a current digital image. The matching area module 254 delimits the area which is matched with the reference area. The delimitation allows a faster analysis of the reference area and reduces the computational complexity of the displacement detection process. Then, the matching area module 254 is used to identify a matching area within the boundaries of a later frame, the later frame being an additional digital image that is received in a later point in time. The positions of the matching area and the reference area are transferred to a displacement detection module 255. The displacement detection module 255 is used to generate the current motion vector of the portable autonomous device based upon the positions of the reference area and the matching area. Based upon the motion vector, the directional instructions 256 are output to one or more of the applications 257 of the portable autonomous device 250. A display 258 is used to inform the user regarding the calculated motion vector, according to the different application outputs.

Figure 9D:
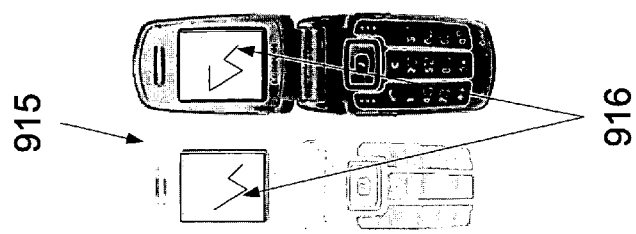
FIG. 9D is a schematic illustration of the displacement of a mobile phone which is used to lengthen a line which is displayed on the mobile device's screen.
Figure 9C:
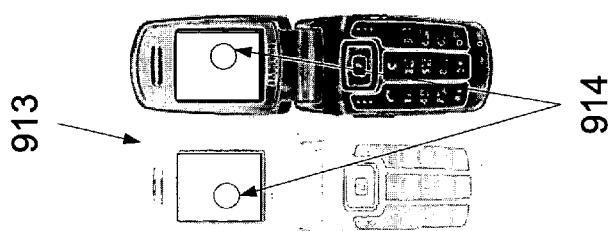
FIG. 9C is a schematic illustration of the displacement of a mobile phone which is used to displace a graphical object on the mobile device's screen.
Figure 9B:
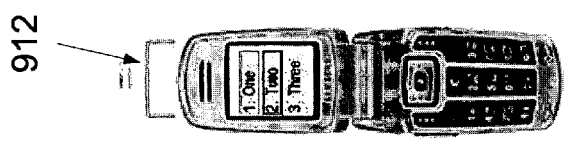
FIG. 9B is a schematic illustration of the displacement of a mobile phone which is used to navigate through displayed menus.
Figure 9A:
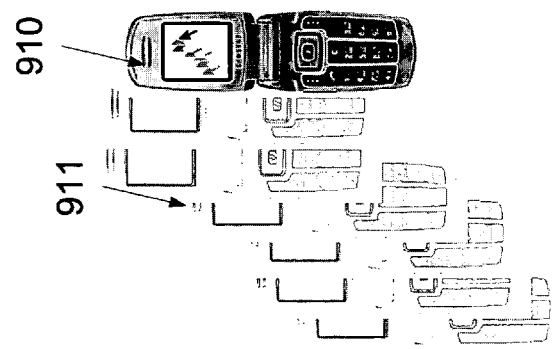
FIG. 9A is an exemplary schematic illustration of the displacement of a mobile phone which is used to input control signals in order to control a displayed cursor.

Reference is now made to FIGS. 9A, 9B, 9C and 9D which depict schematic illustrations of mobile phones which use the displacement detection process for controlling different functions of the drawing tool. As shown at step 3 of FIG. 2, during every cycle of the displacement detection process, a motion vector is output based upon the displacement of the device. FIG. 9A depicts one embodiment of the present invention that comprises a cursor control module, stored on the portable autonomous device, which may be operated when motion vectors are received. The user may simply physically displace the portable autonomous device 910 to cause the cursor displacement to be recognized thereby. A displacement of the mobile phone is shown at numeral 911. The portable autonomous device 910 displacement may be carried out within any chosen two-dimensional plane. The curser may be used, in combination with one of the mobile phone keys, to choose a certain graphical object or to mark boundaries on the virtual blackboard which is displayed on the mobile phone screen. The cursor may also be used in the same manner to color certain graphical objects, such as a scene or an outline. The user may choose between different colors from a virtual palette by using the curser to point to a certain color from the virtual palette and to drag and drop it onto a target location which is displayed on the mobile phone screen.

Motion vectors may be used to operate different functions of the drawing tool. For example, motion vectors may be used to navigate through toolbars, dialog boxes, windows, and hierarchical menus in which some of the options open into sub-menus. The users can thus use the displacement detection process as an interface for managing graphical objects, the thickness of the drawing lines, and brash settings, and for browsing the different drawings.

In a particular example, as shown in FIG. 9B, vertically moving the mobile phone 912 allows a user to navigate through a menu. The direction of the motion vectors parallel to the vertical axis is converted to navigational instructions that reflect the user selection.

In another example, as shown in FIG. 9C, horizontally moving the mobile phone 913 allows a user to horizontally displace a graphical object 914 over the mobile phone display. The horizontal movement of the mobile phone 913 determines motion vectors parallel to the horizontal axis, which are converted to navigational instructions that reflect the direction the user desires to displace the graphical object 914. The displacement of the mobile phone 913 may also be used to change the size, color, line thickness, line length, or shape of the displaced graphical objects.

In another example, as shown in FIG. 9D, moving the mobile phone 915 allows a user to create a line which is displayed 916 on the mobile phone display and to lengthen it. The movement of the mobile phone 913 determines motion vectors, which are converted to navigational instructions that reflect the direction the user desires to lengthen the drawn line 916. The displacement of the mobile phone 915 may also be used to change the color, thickness, or shape of the line, for example by using the curser for drag and drop functions, as described above.

Figure 10:
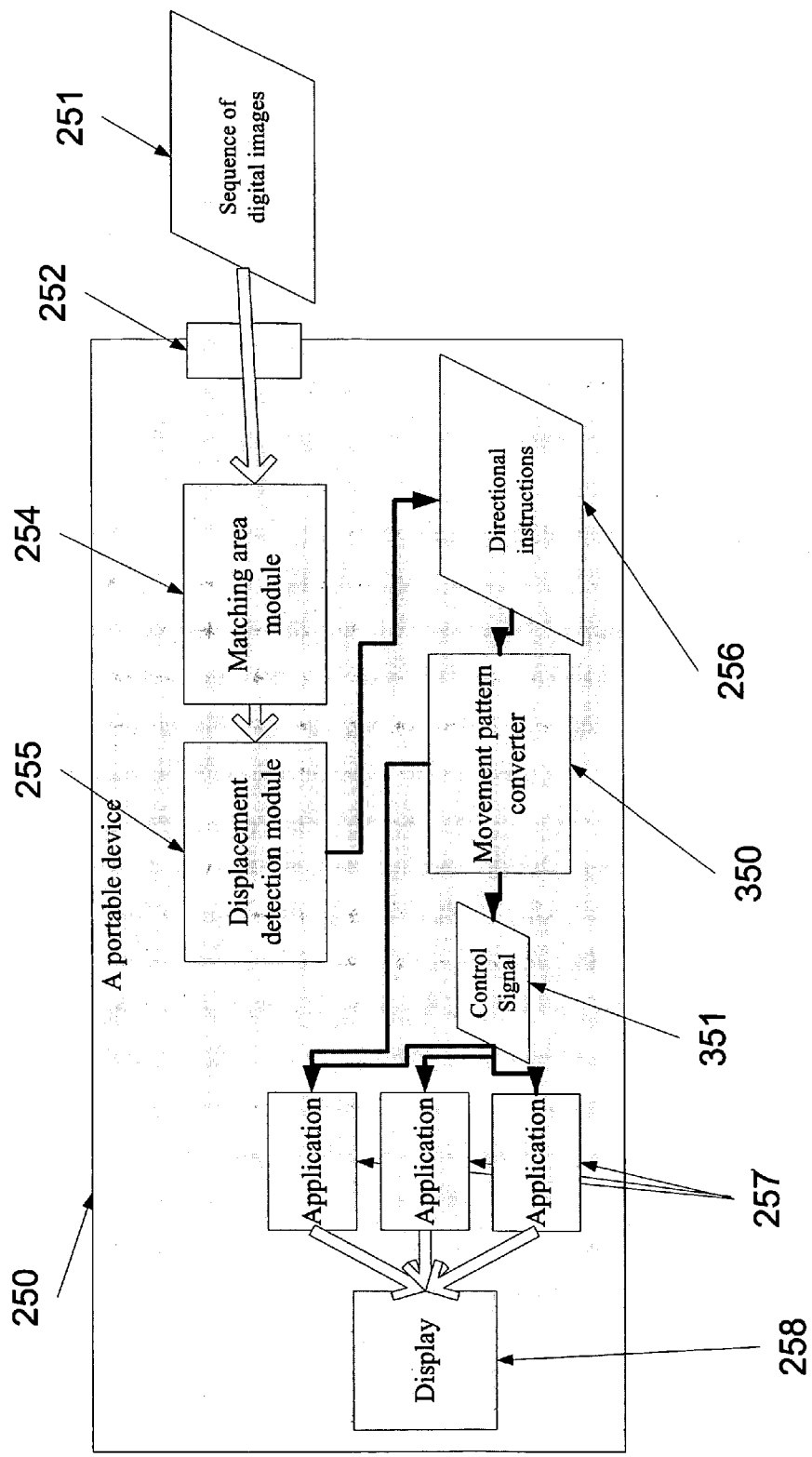
FIG. 10 is a schematic illustration of a device for converting a sequence of digital images taken along a predefined movement pattern to a control signal which may be transferred to an application, according to a preferred embodiment of present invention.

Reference is now made to FIG. 10, which depicts another embodiment of the present invention. The portable autonomous device 250, the digital images 251, and the image input module 252 are as in FIG. 8 above. However, in the present embodiment, a movement pattern converter 350 is added.

Preferably, the portable autonomous device 250 comprises a user interface which is configured to allow users to initiate and terminate the capturing of the sequence of digital images. In mobile phones, for example, the capturing may be initiated via a simple set of commands issued by pressing designated keys on the keypad or by pressing a designated button on the housing of the mobile phone. Initiation and termination of the capturing may be actuated by pressing and releasing a button. Alternatively, a user may press a button to initiate the capturing and press the button again to terminate the capturing.

The sequence of digital images 251 is received by the portable autonomous device 250 and is converted by the movement pattern converter 350 to directional instructions, as described above. The movement pattern converter 350 is used to convert a set of directional instructions to a control signal 351 which is associated with one or more applications of the movement pattern converter 350. The movement pattern converter 350 is used as an amalgamating module which is adapted to amalgamate the current motion vector with a sequence of consecutive motion vectors during the displacement of the conversion device, as described below.

The conversion enables users to control different functions of the portable autonomous device 250 or a related device by moving the portable autonomous device 250 along a predefined movement pattern. The conversion further enables the user of the portable autonomous device to input, in the same manner, signals that represent different characters or signs, which have been previously defined. The control signal 351 is transferred to an associated application 257, as described below.

Figure 11:
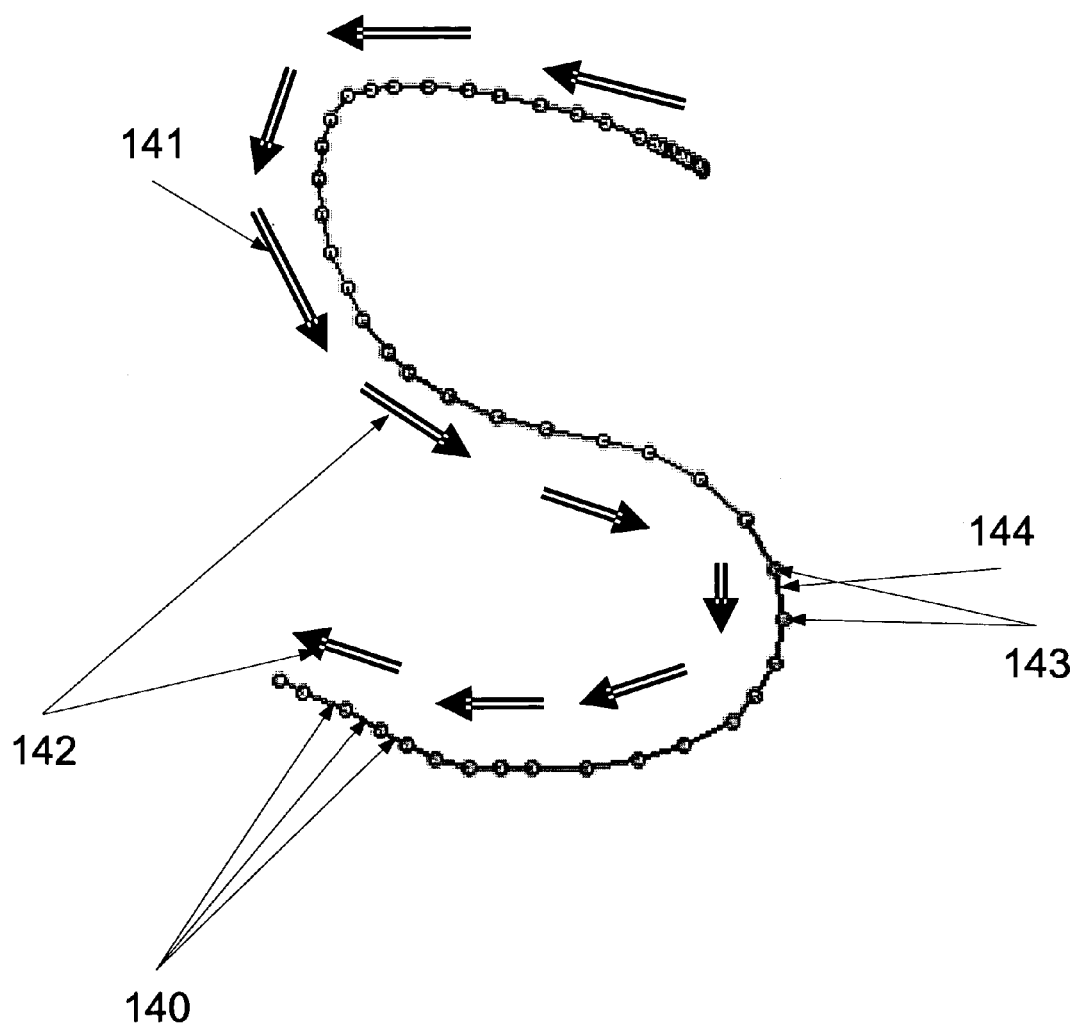
FIG. 11 is an exemplary graphical representation of a set of consecutive motion vectors which are assembled to form a movement pattern, according to a preferred embodiment of present invention.

Reference is now made to FIG. 11 which is a graphical representation of a set of consecutive motion vectors 140 which are assembled to form a movement pattern 141. Each motion vector 140 of the movement pattern 141 represents the motion of the conversion device during a certain time segment.

As described above, the motion vector generator and movement pattern converter are used to convert the sequential digital images to a control signal. Preferably, conversion device is configured to convert a number of different predefined movement patterns to different respective control signals. In such an embodiment, the user maneuvers the conversion device approximately along a track 142 that follows the outline of a predefined movement pattern in order to transmit information to the movement pattern converter regarding a certain associated sequence of control signals. Preferably, in order to identify the predefined movement pattern and to associate it with a certain control signal, the motion vector generator utilizes image processing.

Figure 12:
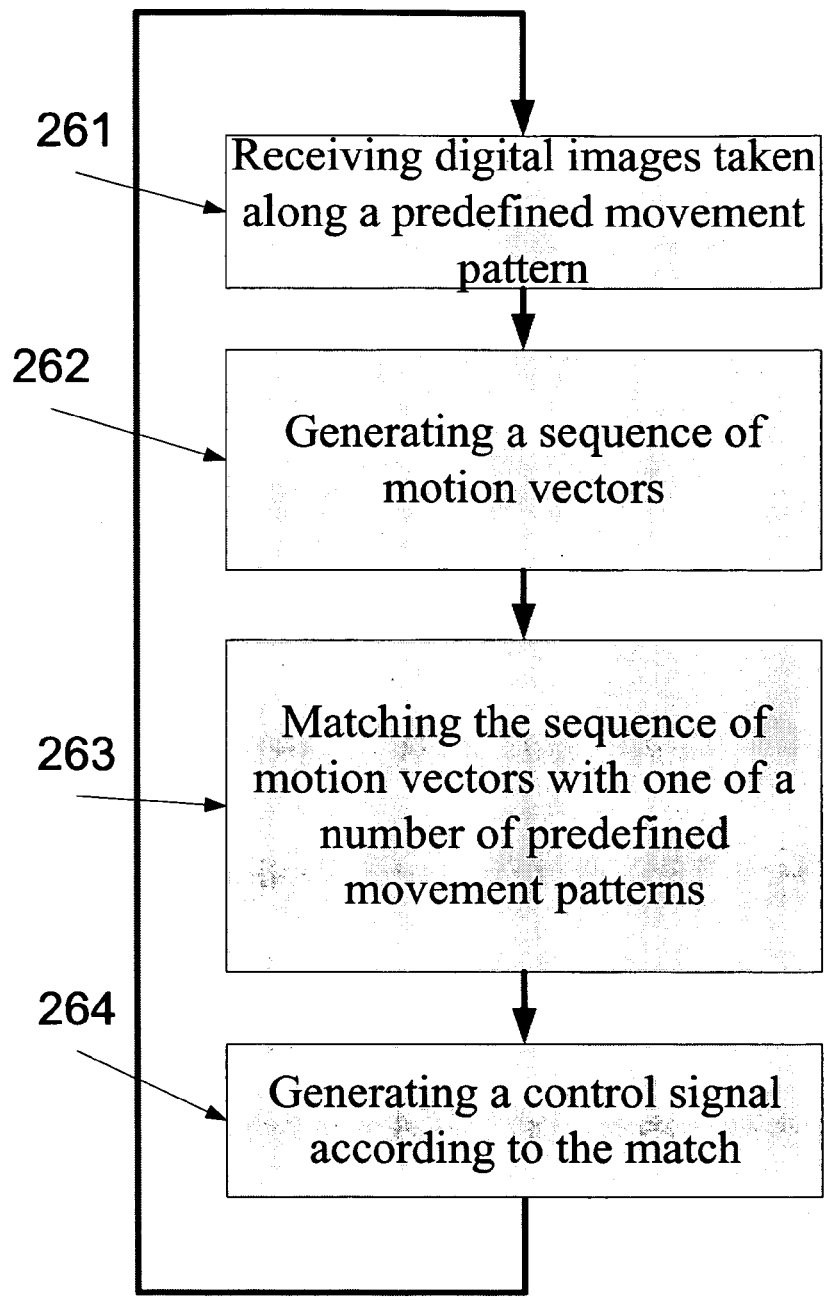
FIG. 12 is a simplified flowchart diagram of a four-step process for converting a sequence of digital images to a control signal, according to a preferred embodiment of the present invention.

Reference is now made to FIG. 12, which is a flowchart that illustrates a four-step process for converting sequential digital images to a control signal, according to a preferred embodiment of the present invention. During the first step, 261, the movement pattern converter receives sequential digital images. In one embodiment of the present invention, each one of the digital images comprises a plurality of color pixels, each pixel comprising color information. The color information of each pixel is used for the image processing.

During step 262, a sequence of motion vectors is generated by the movement pattern converter. As described above, the sequential digital images are taken along a predefined movement pattern. In order to identify the predefined movement pattern during which the sequential digital images have been taken, the motion vectors that comprise the predefined movement pattern have to be separately calculated. Preferably, each of the sequence of motion vectors is calculated based on the differences between two consecutive digital images by the motion vector generator, as described above in relation to FIG. 3A, FIG. 3B and FIG. 4.

Figure 13:
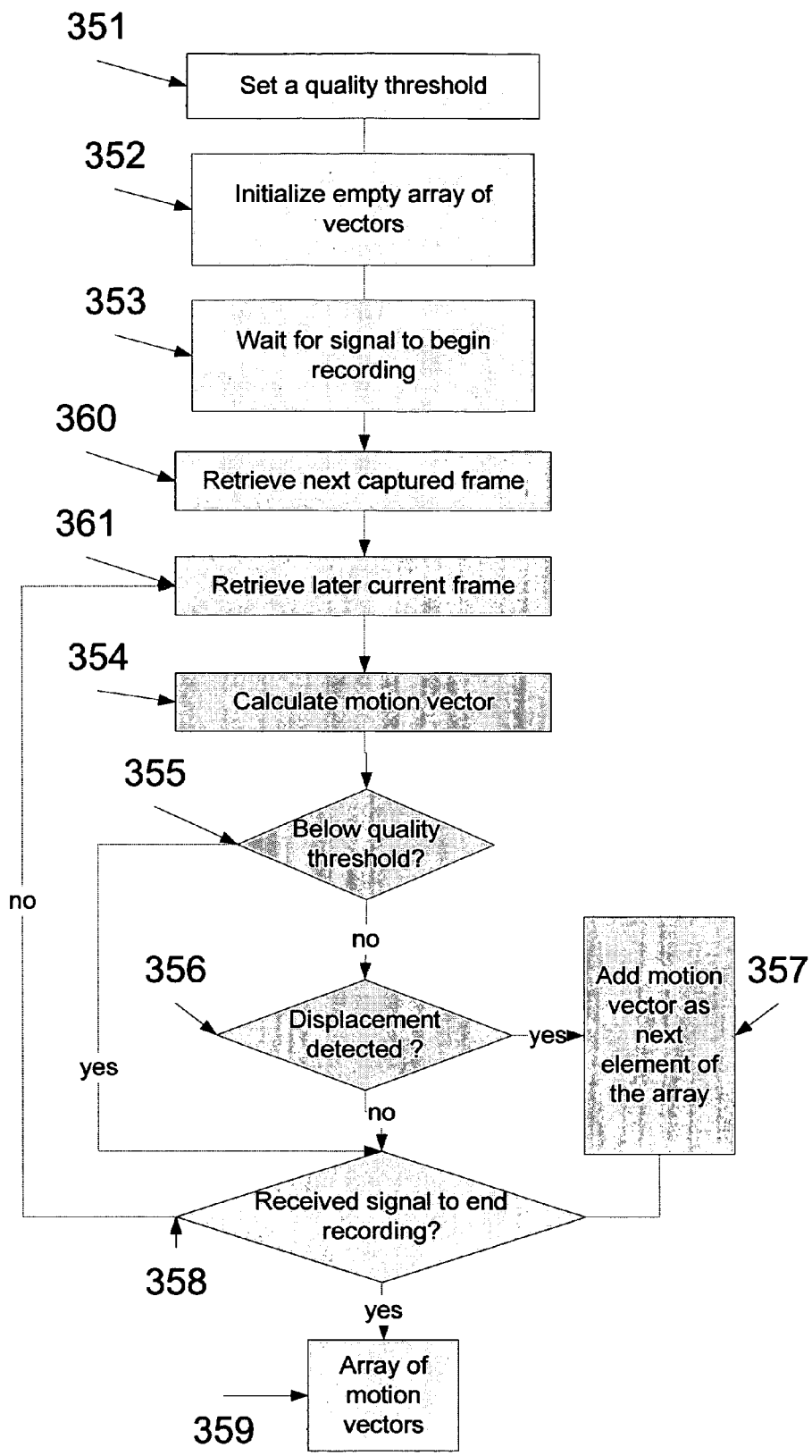
FIG. 13 is a flowchart that illustrates the generation of a sequence of motion vectors, according to a preferred embodiment of the present invention.

Reference is now made to FIG. 13, which is a flowchart that illustrates the generation of a sequence of motion vectors, according to a preferred embodiment of the present invention. In the first step of the generation of a sequence of motion vectors, as shown at 351, a quality threshold is set. The quality threshold reflects the estimated quality above which a certain motion vector is defined as a valid motion vector. This ability facilitates the integration of many known algorithms which are used to estimate the validity of the motion vector value, preferably in respect to previous motion vectors. The quality threshold is being used in a later step of the process, as shown at 355.

In the following step, as shown at 352 a motion vector array is initialized. The motion vector array is configured to store an undefined number of motion vectors. Preferably, the array is defined dynamically in a manner that promises flexibility. Then, the process enters a waiting stage in which motion vectors are not recorded until an initiation signal is received, as shown at 353. Preferably, the user has to press a predefined button in order to generate such an initiation signal. After the initiation signal has been received, as shown at 360 and 361, a current frame and a next captured frame are retrieved to allow the calculation of a motion vector. The motion vector is preferably calculated using the current frame and the next captured frame as described in relation to FIGS. 3A-3E. As the process is iterative, a motion vector is preferably calculated for each two consecutive frames by the motion vector generator, as described above, and shown at 354.

In 355, the quality threshold, which has been calculated in a previous step, is now used. If the quality level of the calculated motion vector is below the quality threshold, or the calculated motion vector indicates there was no displacement of the conversion device, as shown at 356, another motion vector is calculated. However, if the quality level of the calculated motion vector is above the quality threshold, and the calculated motion vector indicates there was a displacement of the conversion device, the calculated motion vector is added to the motion vector array, as shown at 357. In the following step 358, the reception of a termination signal is probed. In one embodiment of the present invention, the user can generate a termination signal by pressing a designated button. If no termination signal is received, another motion vector is calculated.

As described above, the additional motion vector is preferably calculated according to differences between the later of the two current frames and an additional frame which is used as a later frame. Therefore, as shown at 361, if the reception of a termination signal has not been probed, the later of the two current frames is forwarded for the calculation of the next motion vector with the next captured frame. As further shown at FIG. 13, the acquisition of a sequence of motion vectors is a circular process which is calculated in a repetitive manner.

As depicted in FIG. 13, at the period between the reception of an initiation signal and termination signal, motion vectors are added to the motion vector array in a cyclic manner. Since the user preferably has the ability to generate these signals, as described above, the user can delimit a certain period for recording a certain movement pattern. The process ends when a motion vector array that comprises a sequence of consecutive motion vectors is generated, as shown at 359. The generated sequence represents the certain movement pattern which was performed during the displacement of the conversion device, as described above.

Reference is now made, once again, to FIG. 11 which depicts a sequence of motion vectors 140 which are based on real time digital images taken along a predefined track 142. Each line 144 between two consecutive dots 143 represents a calculated motion vector which is associated with the movement of the conversion device during a certain time segment. FIG. 11 depicts a preferred embodiment of the invention in which the movement pattern 141 has been taken along a predefined track having the shape of the character 'S'.

Reference is now made, once again, to FIG. 12. As described above, a sequence of motion vectors is generated according to the sequential digital images. The next step, as shown at 253, is to match the sequence of motion vectors with one of a number of predefined movement patterns. The sequence of motion vectors is generated according to sequential digital images which have been taken along a certain movement pattern. The user may use the conversion device to input a number of movement patterns. Each movement pattern is used to generate a different control signal. In one embodiment of the present invention, the movement pattern converter comprises a pattern sample repository that comprises pattern sample records; each pattern sample record is associated with a corresponding control signal. Preferably, the number of the pattern sample records is variable and can be adjusted by the user. Each pattern sample record preferably comprises an array of a predefined number, preferably 24, motion vectors. Preferably, if a sequence of spatial motion vectors is acquired, as described above, each pattern sample record comprises a sequence of spatial motion vectors. The motion vectors preferably have a uniform length that preferably can be addressed as a unit. Accordingly, the motion vectors reflect only the directional changes along a related movement pattern. The motion vectors of each array are sequentially arranged according to a certain predefined movement pattern. Such movement patterns may be shaped in the form of common characters, common signs, common symbols, or individually configured markings such as signatures, as described below.

Figure 14A:
FIG. 14A is an exemplary graphical representation of a sequence of motion vectors that represent a certain movement pattern.
Figure 14B:
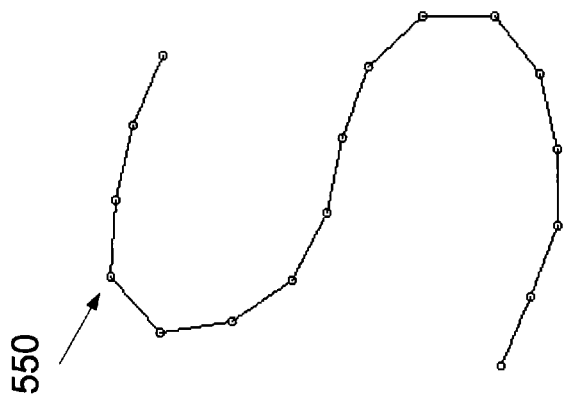
FIG. 14B is an exemplary graphical representation of a sequence of normalized motion vectors, which have been generated according to the sequence of motion vectors of FIG. 14A.
Figure 14C:
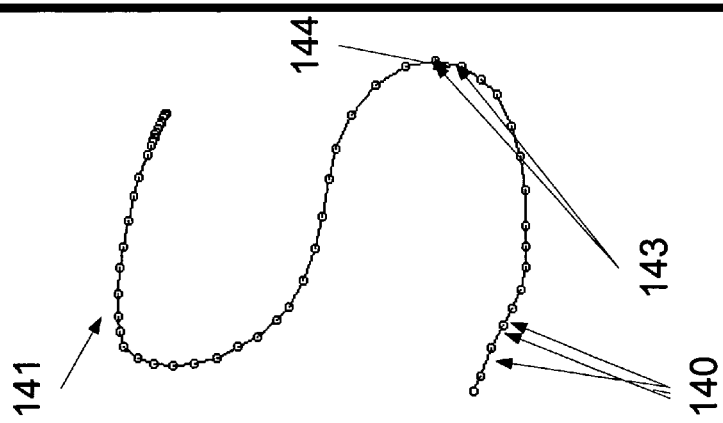
FIG. 14C is a graphical representation of an exemplary character, which has a pattern common to the sequence of motion vectors of FIG. 14A and the sequence of normalized motion vectors of FIG. 14B.

Reference is now made to FIGS. 14*a*, 14*b*, and 14*c* which respectively depict a sequence of motion vectors that determine a certain movement pattern 141, a sequence of normalized motion vectors 550 with uniform length, and an exemplary character 551. The graphical representation of a sequence of motion vectors of FIG. 14*a* is as in FIG. 11 above.

As described above, in one embodiment of the present invention the movement pattern converter comprises a pattern sample repository. Such an embodiment allows the movement pattern converter to match the acquired sequence of motion vectors with one of a number of pattern sample records, each comprising a different predefined movement pattern. However, unlike the pattern sample records that comprise a sequence of predefined motion vectors of uniform length, the acquired sequence of motion vectors comprises an undefined number of motion vectors having different lengths, as depicted in FIG. 11. In one embodiment of the present invention, motion vectors of the acquired sequence are gathered and operated on to form normalized vectors, preferably with a uniform length, before the sequence is compared with the records of the pattern sample repository.

Figure 15A:
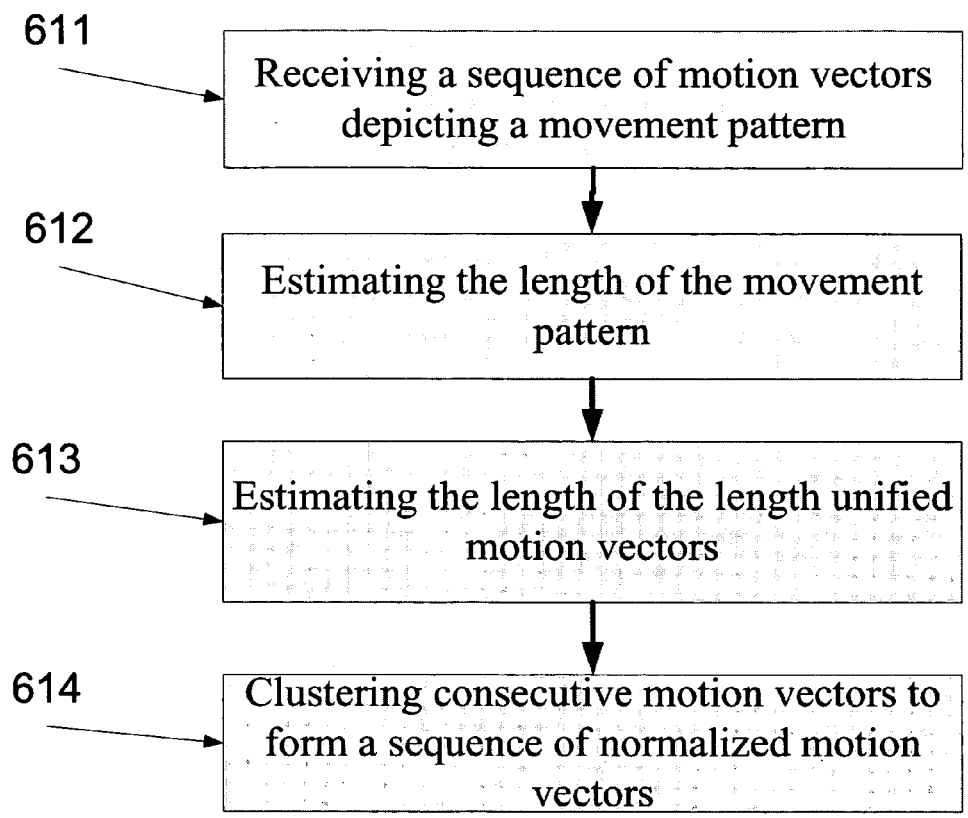
FIG. 15A is a simplified flowchart diagram of a process for generating a sequence of normalized motion vectors, according to a preferred embodiment of the present invention.

Reference is now made to FIG. 15A, which is a flowchart that illustrates a five-step process for generating a normalized sequence of motion vectors, according to a preferred embodiment of the present invention. As further described below the sequence of motion vectors is matched with records that store a sequence of motion vectors that represent a certain movement pattern. These records have a predefined number of motion vectors that comprise a certain movement. In order to match the sequence of motion vectors with the stored records, the sequence of motion vectors have to be segmented according to the predefined number of motion vectors which are stored in these records. Such segmentation allows a matching process, as described in more detail below.

During the first step, 611, a sequence of motion vectors which depicts a movement pattern, as described above, is received. Preferably, the acquired sequence is an array having a number of records, each record comprising a motion vector having a specific length.

During the following step, 612, the length of the movement pattern is estimated. This estimation is done by summing the length of the motion vectors that comprise the acquired sequence. By estimating the length of the movement pattern, the length of the length unified motion vectors can be determined, as shown at 613. The total length of the acquired sequence is preferably divided by a predefined number that represents a required number of motion vectors. As described above, each record of the pattern sample comprises an array having a predefined number of motion vectors, for example 24. In the next step, as shown at 614, the acquired sequence of motion vectors is divided to length-unified segments motion vectors which are later normalized, before it is matched with each one of the pattern samples. The number of length unified motion vectors is equivalent to the number of motion vectors which are stored in the pattern samples. During the process, the acquired sequence is divided into a similar number of length-unified motion vectors. Preferably, the length of each length-unified motion vector is calculated by dividing the length of the movement pattern into a predefined number of segments which are represented as motion vectors, as described above. The calculated length is stored in order to allow the segmentation of the sequence of motion vectors to groups with equal length, as described below.

Figure 15B:
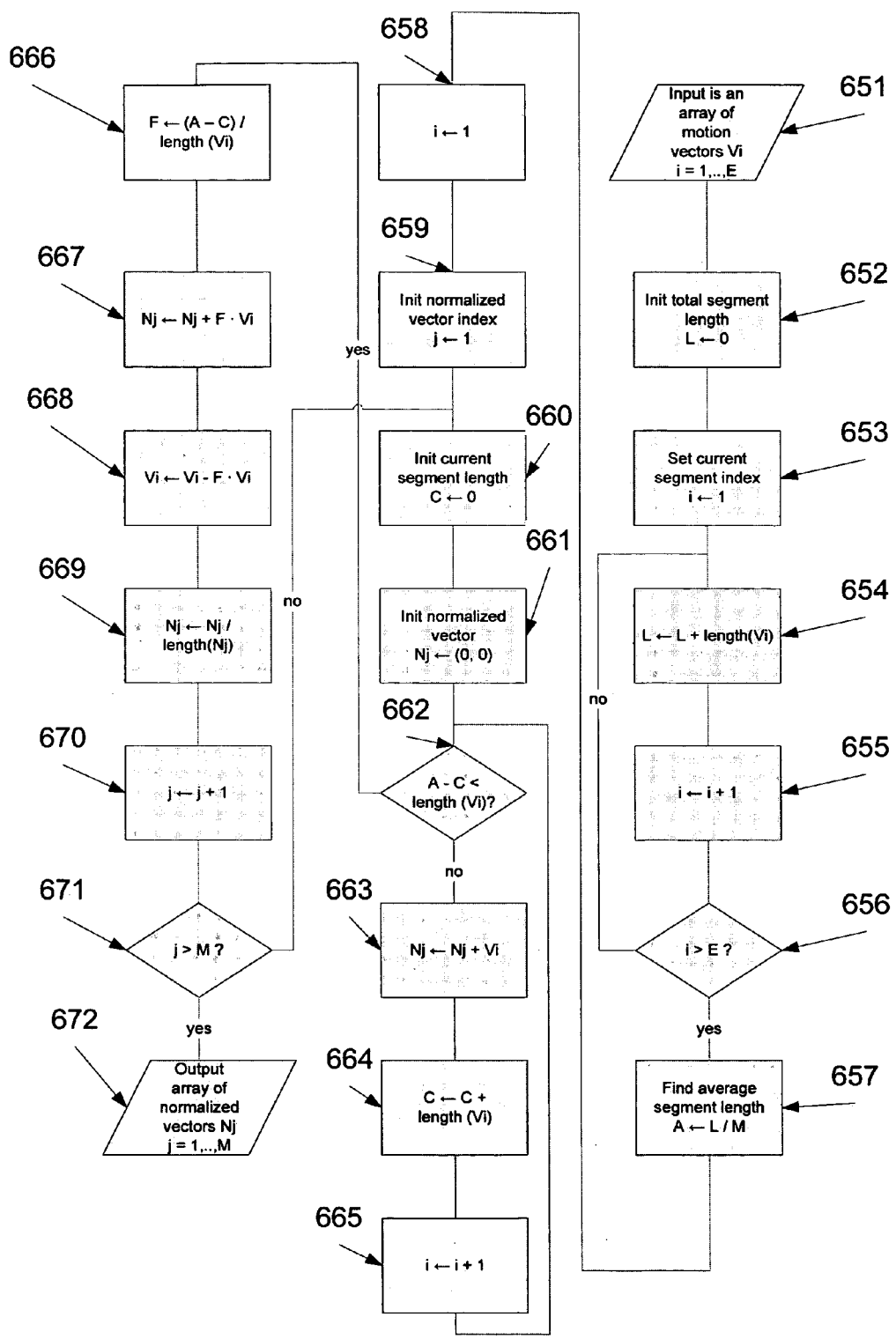
FIG. 15B is another simplified flowchart diagram of the process for generating a sequence of normalized motion vectors, according to a preferred embodiment of the present invention.

As described above, in step 614, after the total length of the acquired sequence motion vector has been estimated according to the total length of the sequence, the acquired sequence of motion vectors may be divided into segments of consecutive normalized motion vectors Reference is now made to FIG. 15B, which is a flowchart that illustrates in greater detail the normalized motion vector generation process which is depicted in FIG. 15B, according to a preferred embodiment of the present invention. In FIG. 15B j denotes the consecutive order of a current normalized motion vector, i denotes the consecutive order of the current motion vector, E denotes the number of the current motion vectors, L denotes the total length of the current motion vectors, M denotes the number of normalized motion vectors (e.g. 24), N denotes a normalized motion vector, V denotes a current motion vector, A denotes a uniform length of the length unified motion vector, C denotes the current length of the segment of motion vectors forming the current length-unified motion vector, and F denotes the difference between the uniform length (A) and the length of the currently processed normalized motion vector (N(j)).

As shown at 651, initially a sequence of motion vectors, which depicts a movement pattern, preferably stored in an array (V(i)) is received. Preferably, the acquired sequence is an array having a number of records, each record comprising a motion vector having a specific length. After the sequence of motion vectors has been received, the length of the movement pattern is estimated. As depicted in steps 652 to 657 the length estimation is done by summing the length of the motion vectors that comprise the acquired sequence. As shown at steps 654 to 656, the summing is done in an iterative process in which the lengths of all the motion vectors are summed together into a single variable (L). As shown at 657, after the length of the movement pattern has been estimated, the total length (L) of the acquired sequence is divided by a predefined number that represents a required number of motion vectors (M). The outcome of this deviation (A) is a uniform length according to which the sequence of motion vectors is segmented to form normalized motion vectors, as described in steps 662 to 669. Now, as shown at steps 658 to 659 different variables which are used in the normalized motion vector generation process are reset. Then, as shown at steps 661 to 671, sub-process in which a normalized motion vector is generated according to the uniform length (A) determined in step 657. This sub-process is iterative and allows the generation of consecutive normalized motion vectors, as described below. During each one of the iterations of the sub-process, variables that represent the currently processed motion vector are initialized. Preferably, the currently processed normalized vector N(j) and the variable C that denotes its current length are initialized, as respectively shown at 661 and 661. Then, as shown at steps 662 to 665 a number of consecutive motion vectors are added to form the currently processed normalized motion vector N(j). The consecutive motion vectors are continuously added as long as the sum of their lengths does not exceed the uniform length A, as shown at 662. Accordingly, by connecting the following consecutive motion vector the segment which is currently processed is extended beyond the estimated uniform length (A). In order not to exceed the estimated uniform length (A), the gap between the length of the connected consecutive motion vectors that comprise the segment and the normalized length (A-C) is completed by a portion of a consecutive motion vector F·V(i), as shown at steps 666 and 667. As shown at 668, the rest of the consecutive motion vector is added as the first vector that comprises the following normalized vector, N(j+1), which is processed during the following iteration of the process (j+1). Preferably, as shown at 669, after the length of the last motion vector or a portion thereof was added, the new segment (N(j)) is being normalized to a uniform unit size (N(j)=N(j)/Length(N(j))), as further described below. As shown at 671, the iterative sub-process which is shown at steps 660 to 671 continues until the last motion vector has been allocated to the last segment. Accordingly, as shown at 672, during the normalized motion vector generation process a sequence, preferably an array, of normalized vectors is generated. Unlike motion vectors of the acquired sequence of motion vectors, the normalized motion vectors of the sequence of normalized motion vectors have uniform length. After the uniform motion vector generation process has ended, the sequence of normalized motion vectors may be directly compared with a number of potential pattern sample records. FIG. 14B depicts a graphical representation of such a sequence of uniform motion vectors.

During the normalized motion vector generation process each motion vector is normalized by dividing by the motion vector length (N(j)=N(j)/Length(N(j))). In particular, this part of the normalization is preferably defined according to the following equations:

$$x' = x/\sqrt{(x^2+y^2)};$$

$$y' = y/\sqrt{(x^2+y^2)};$$

where (x', y') denotes a normalized motion vector and (x, y) denotes a motion vector length unified (A) before it has been normalized. After the motion vectors have been normalized as described above, the differences between them and the motion vectors of the pattern sample records preferably reflect only an angular deviation. The vectors are normalized to unit length (1) in this example as described hereinabove and in FIG. 13.

Figure 16A:
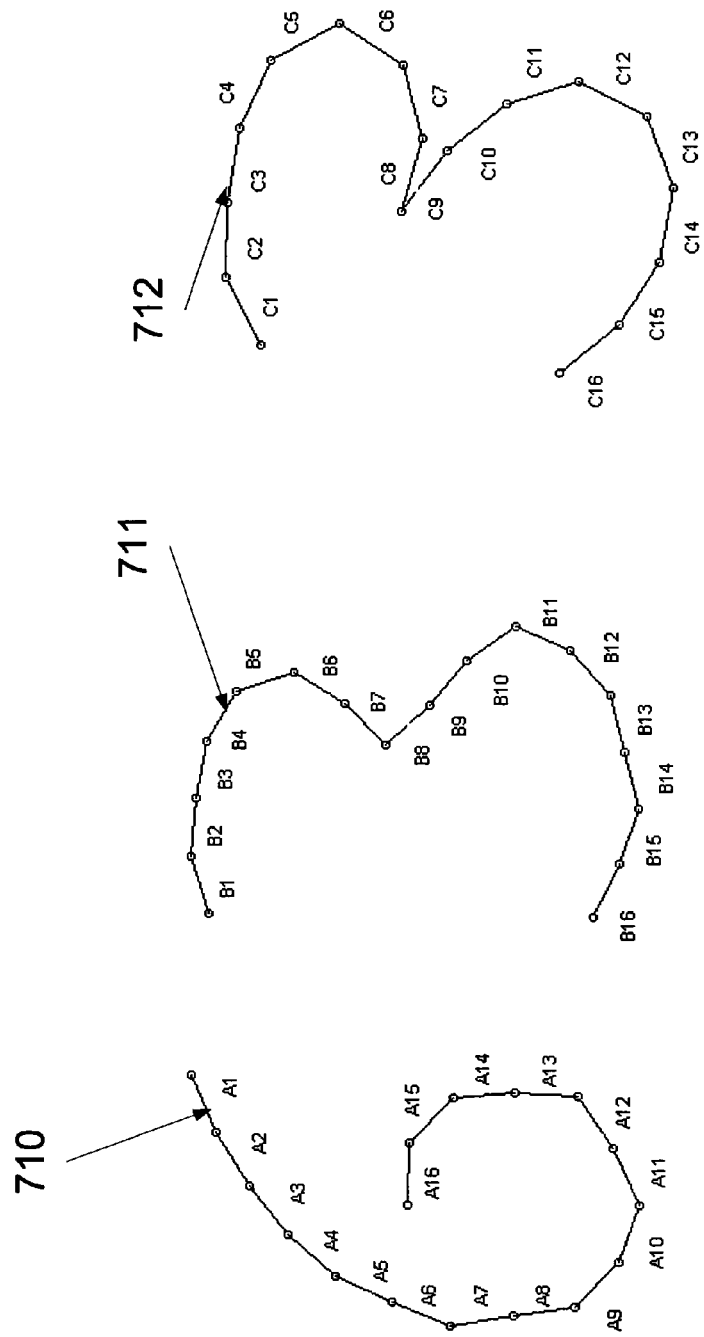
FIG. 16A is a graphical representation of a sequence of normalized motion vectors which has been generated according to a sequence of digital images taken along a movement pattern shaped as the numeral "3" and a pair of pattern sample records which are configured to be matched with movement patterns shaped as a "3" and a "6" respectively.

Reference is now made to FIGS. 16A and 16B, which respectively depict graphical and numeric representations of three sequences of normalized motion vectors, according to a preferred embodiment of the present invention. As described above, the sequence of motion vectors has been normalized; the sequence of normalized motion vectors may be directly compared with a number of potential pattern sample records.

As described above, each pattern sample record comprises a predefined number of normalized motion vectors.

Preferably, in order to evaluate whether a certain pattern sample record matches a sequence of normalized motion vectors, a set of correlation values is calculated. Each correlation value of the set represents a similarity level value that reflects the similarity between a normalized motion vector (x', y') and a corresponding motion vector of the evaluated pattern sample record (Px, Py). Since, preferably, both motion vectors are normalized in the same manner, the differences between the motion vectors reflect only the angular deviation between them. Preferably a similarity level value (SLV) is calculated as a correlation value. The SLV is preferably defined according to the following equation:

$$SLV = (x' \cdot Px) + (y' \cdot Py)$$

Since both the motion vector (x',y') and the pattern sample record (Px,Py) are normalized, the similarity level values are between −X and X, where X represents the highest similarity level and −X represents the lowest similarity level. X is preferably equal to 1. FIG. 7 is a graphical representation of a set of exemplary normalized motion vectors 810 and corresponding motion vectors 811. As depicted, the similarity level values 812 correspond to the angular deviation between each normalized motion vector 810 and its respective corresponding motion vector 811.

As described above the sequence of motion vectors defines a certain pattern movement. The motion vectors are arranged in a consecutive order that reflects the sequential digital images which have been taken during the displacement of the conversion device along a certain track. Any movement pattern track follows one or more lines, as shown at numeral 142 of FIG. 11. Thus, in order to generate a stream of sequential digital images that follows a certain movement pattern, the conversion device may be displaced along the track of the movement pattern.

Preferably, the similarity level value of all the motion vectors that define a certain pattern sample record are summed to yield a match score that reflects the similarity level of the pattern sample record in relation to the sequence of normalized motion vectors.

FIG. 16A depicts a sequence of normalized motion vectors which has been generated according to sequential digital images taken along a movement pattern 712 shaped as a "3." The figure further depicts two exemplary pattern sample records which are configured to be matched with a sequence of normalized motion vectors. One exemplary pattern sample record 711 is configured for a movement pattern shaped as a "3" and another exemplary pattern sample record 710 Is configured for a movement pattern shaped as a "6."

FIG. 16B depicts two tables 713 and 714, each comprising similarity level values of different pattern sample records in relation to the normalized motion vector movement pattern 712. The table 714 at the left comprises similarity level values of the pattern sample record which is configured for a movement pattern 710, which is shaped as a "6," and the table 713 at the right comprises similarity level values of the pattern sample record which is configured for a movement pattern 711, which is shaped as a "3." Clearly, since the sequence of normalized motion vectors represents a movement pattern shaped as a "3," its vectors are similar to the vectors of the pattern sample record which is configured for movement pattern 711. The match score of the pattern sample record which is configured for movement pattern 713 is substantially higher than the match score of the other pattern sample record, for movement pattern 714.

In one embodiment of the present embodiment all the match scores of all pattern sample records are calculated. Based upon the calculations of the match scores, the pattern sample record that has the highest match score is chosen as a match to the sequence of normalized motion vectors. In another embodiment, a matching threshold is predefined. If a pattern sample record has a match score higher than the matching threshold, the pattern sample record is chosen and the match scores of other pattern sample records are not calculated.

The matching threshold may also be used as a means to avoid erroneous matching. As described above, the pattern sample record having the highest match score is chosen as a match to the sequence of normalized motion vectors. By implementing such an embodiment, a random movement pattern which is not defined, or is approximately defined at any pattern sample, may be chosen as a match to the sequence of normalized motion vectors only because it has the highest match score. Hence, in order to avoid such an erroneous match, a matching threshold that determines the minimum match score may be used. Preferably, the movement pattern converter outputs an error message that indicates that an error has occurred and, preferably, the match score or type of error.

As described above, the movement pattern converter comprises a pattern sample repository. Each pattern sample record is configured to be matched, as described above, with a corresponding movement pattern. Each pattern sample record is associated with a control signal. In one embodiment of the present invention the pattern sample repository comprises pattern sample records which are configured to be matched with movement patterns of all the characters which are available on a common keyboard. In such an embodiment, the control signals of the pattern sample may be used as control signals of a keypad or a keyboard of the conversion device. The displacement of the conversion device along a movement pattern track generates a notification of that event which is sent to a program which is currently active on the memory of the conversion device.

When a sequence of spatial motion vectors is calculated, as described above, spatial movement patterns may be matched to generate a control signal. In such an embodiment, each pattern sample record is configured to be matched, as described above, with a spatial movement pattern.

In one embodiment of the present invention the conversion device further comprises a communication interface module that facilitates the transmission of the control signals to a designated destination. For example, a cellular transmitter may be used to send the control signals to a remotely located device. Other transmitters, such as radio frequency (RF) transmitters, may used to transmit the control signals. For example, Wi-Fi or other standards for wireless local area networks (WLAN) based on the IEEE 802.11 specification transmitters may be used to transmit the control signals. BLUETOOTH®, a standard for short-range digital transmission, can be used as a communication protocol for the RF communication. The conversion device may also be wired to another remotely located device. The wire connection preferably provides wired serial communication. The serial communication may include an RS-232 connection, an Ethernet connection, a Universal Serial Bus (USB) connection, a cellular transceiver connection, a Firewire connection, a USB2 connection, a BLUETOOTH® standard for short range digital transmission compatible connection or an IR connection. Preferably, the USB or the USB2 connection can be used as a power supply, supplying electrical current to the conversion device.

However, since the control signals are chosen according to a match between the sequence of normalized motion vectors and predefined pattern samples, the conversion device cannot identify movement patterns which are not represented by one of the pattern sample records.

Figure 17:
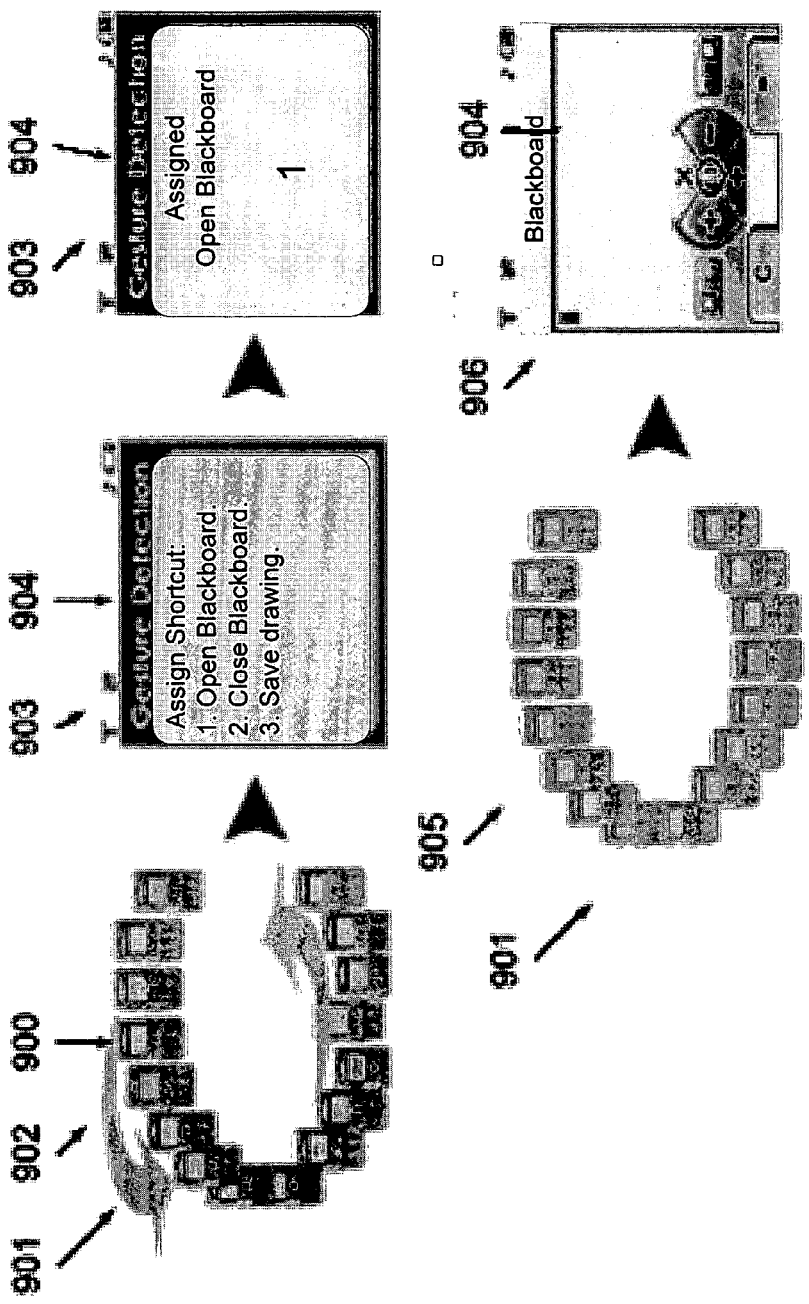
FIG. 17 depicts a mobile phone and some of its displays during the recording of movement pattern into the pattern sample repository and during the usage of the recorded movement pattern, according to a preferred embodiment of the present invention.

Reference is now made to FIG. 17, which depicts schematic illustrations of a mobile phone and some of its displays during the learning mode, which is a process involving recording of movement patterns into the pattern sample repository and during the usage of the recorded movement pattern. In one embodiment of the present invention, the movement pattern converter comprises a movement pattern learning unit. The movement pattern learning unit is configured to allow a user to configure the records of the pattern sample repository during a learning mode. The learning mode is similar in many ways to the gesture recognition process. The pattern sample records are configured to be matched with sequential digital images which have been taken along an individually configured movement pattern. The configuration of the pattern sample records during the learning mode is done in the same manner that a sequence of normalized motion vectors is generated. This generation process is described in relation to FIG. 13, FIG. 15A and FIG. 15B.

Preferably, a user configures one of the pattern sample records by capturing sequential digital images taken by displacing the conversion device along a new movement pattern or by reassociating a pattern sample record with different functions of the drawing tool.

During the learning mode the configuration is done by converting the captured sequential digital images to a corresponding sequence of motion vectors which is stored in a pattern sample record. As described above, the corresponding sequence of motion vectors are generated in the same manner that a sequence of normalized motion vectors is generated. The user further associates a related control signal with the pattern sample record.

FIG. 9 depicts an exemplary learning process during which, the conversion device is a mobile phone 900 with an integrated camera in a learning mode and the control signal is a "C" shaped movement. In FIG. 17, a user uses the movement pattern learning unit to configure a 'C'-shaped movement pattern 901 with a control signal that actuates the mobile phone to launch the drawing application and display an empty drawing space. As shown at 902, in order to assign the 'C'-shaped movement pattern, the user maneuvers the mobile phone along a 'C'-shaped movement path. Than, as shown at 903, the mobile phone screen 904 displays a menu that allows the user to assign the movement pattern with a certain function or graphical object. In this step, a new pattern sample record is assigned and associated with the 'C'-shaped movement pattern. In the following step, as shown at 905, the mobile phone screen 904 displays a confirmation message that indicates the reception of the new pattern sample record. The new pattern sample record allows users to use the 'C'-shaped movement pattern 901 as a shortcut for accessing the drawing application of the mobile phone, as shown at 905 and 906 by repeating the 'C' gesture and comparing the stored and sample gestures as described hereinabove. The recorded sequence of motion vectors that represent the movement pattern is preferably converted to a sequence of normalized motion vectors with a uniform length. The conversion process is preferably identical to the aforementioned conversion process. It should be noted that any other functions of the drawing tool can be associated with any of the pattern sample records. For example, a control signal that tells the mobile telephone to store a copy of the drawing or to send it as an SMS to a certain number or an email address may be associated with one of the pattern sample records.

As described above, the reception of a sequence of motion vectors may be accompanied by a command to identify the gesture. This initiates the matching process in order to match a pattern sample record. The pattern sample record may be associated with any function of the drawing tool. For example, any pattern may be associated with drawing a particular shape such as a circle or a square or even with selecting a particular color. Accordingly, any function of the drawing tool may be performed, as a reaction to and correlated with the performance of the gesture. During the aforementioned learning mode such a sequence of motion vectors or gestures may be associated with any function of the telephone.

Preferably, the movement pattern learning unit is used to reassociate a predefined movement pattern of a certain pattern sample record. A user may, for example, reassociate an 'S'-shaped predefined movement pattern which is used for indicating typing the letter 'S' as a turn off instruction that instructs the device to shutdown the drawing tool.

Preferably, the conversion device is coupled to a display device and a viewing module. The viewing module is configured to output a graphical user interface (GUI) to a display device that displays a user input interface. Preferably the user input interface allows a user to associate a certain control signal with a new pattern sample record. The associated control signal is chosen by using the user input interface to input or select a function of either the conversion device or one of the applications which is hosted thereby. Preferably, the user input interface allows the user to input movement patterns by using an MMI which is integrated with the conversion device, thereby interfacing with the movement pattern converter. The user may use the MMI to draw a new movement pattern and to store it as a pattern sample record. As is generally well known, a common pointing device such as a roller and a common textual input device such as a keypad, both connected to the conversion device, can allow a user to input information and to make selections. The means of displaying the interface on the base of the graphical user interface is well known and, therefore, will not be described here in detail.

Preferably, the pattern sample records may be updated or added from an external source. In one preferred example a designated application allows the user to generate or edit pattern sample records using a hosting computing unit, such as a personal computer. The designated application preferably comprises a drawing editor which is configured to allow the user to draw a movement pattern and to store it as a pattern sample record. The drawing is preferably done using a regular mouse. The stored pattern sample records are preferably transmitted to the mobile phone in order to update pattern sample records which are stored locally on his repository, as described above.

Figure 18C:
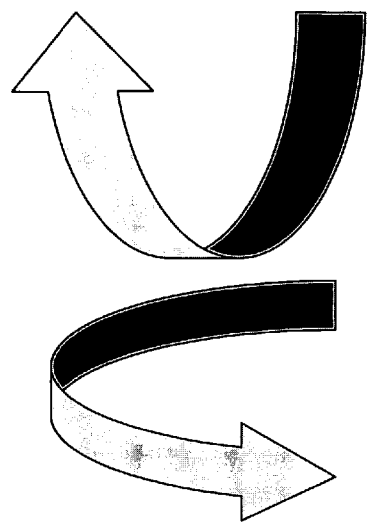
FIGS. 18A, 18B, and 18C are schematic illustrations of movement patterns of a portable autonomous device, according to embodiments of the present invention.
Figure 18B:
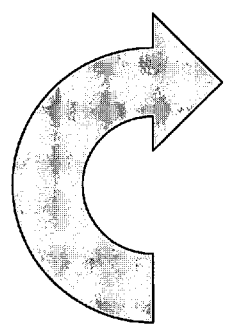
Figure 18A:
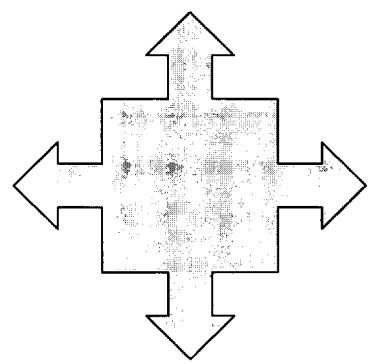

Reference is now made to FIGS. 18A, 18B, and 18C which are schematic illustrations of movement patterns of a portable autonomous device. FIG. 18A depicts a linear movement pattern which can be represented by a single motion vector. FIGS. 9A-D depict the movement of a mobile phone along such movement patterns. FIG. 18B depicts a curved movement pattern of the portable autonomous device. The movement may be represented by a sequence of motion vectors. FIG. 18C depicts a movement pattern which may be represented by a sequence of spatial motion vectors.

In one embodiment of the present invention, the user uses the portable autonomous device for controlling a drawing tool. As described above the portable autonomous device comprises an image sensor and preferably a display device. In some portable autonomous devices, this combination allows users to draw a drawing on a predefined display or on a certain image which has been captured, or any other image which is stored in the portable autonomous device memory. In one embodiment, the portable autonomous device hosts an application which is configured to display a virtual two dimensional space on the screen of the portable autonomous device. The application may emulate, inter alia, a blackboard for drawing purposes. Functions of the drawing tool may be controlled by displacing the portable autonomous device, as described above. The drawing tool may be configured for allowing users to draw a new drawing by displacing the portable autonomous device. Preferably, the displacement of the portable autonomous device is converted to a line, which is drawn as part of the new drawing. More preferably, the displacement of the portable autonomous device is converted to a control signal, which is translated to maneuver graphical objects on the virtual blackboard. In one embodiment of the present invention the drawing tool is configured to allow performing functions which are commonly available in different drawing software which are designated for creating drawing on personal computers such as Microsoft Paint™ or Adobe Photoshop™. Preferably, the displacement of the portable autonomous device may be converted to a control signal that instructs the drawing tool to perform such functions.

Since the portable autonomous device is adjusted to record sequence of motion vectors, the drawing tool may be configured to draw the motion vector either one by one or all together by drawing the captured sequence of motion vectors. The portable autonomous device may be displaced in order to control other functions of the drawing tool such as selecting colors, selecting line thickness, coloring objects, chancing textures, sizing shapes, etc.

In one embodiment of the present invention, the user uses the portable autonomous device for controlling a graphical object which is displayed in on the display device. As described above, the portable autonomous device is adjusted to convert a sequence of digital images to a current motion vector that represents its movement. The current motion vector may be used, as described above, to generate a control signal. Accordingly, such an embodiment may be used for maneuvering graphical objects in a virtual two dimensional space which is displayed one the display device. In one embodiment, the portable autonomous device hosts an application which is configured to display a virtual two dimensional space on the screen of the portable autonomous device. Preferably, by displacing the portable autonomous device, the user may select graphical objects. For example, a graphical object that represents a certain geometric shape may be maneuvered in a two dimensional space that represents a virtual blackboard.

In one embodiment of the present invention the drawing tool may be used for adding words or other signs to the drawing. In such an embodiment, the control signals of the pattern sample may be associated with control signals which represent respective characters such as letters, numbers or signs. When a sequence of motion vectors is calculated, as described above, the movement patterns may be matched to generate a respective control signal.

In one embodiment of the present invention the device further comprises an SMS editor or a text editor. In such an embodiment the control signals of the pattern sample may be associated with control signals which represent respective characters such as letters, numbers or signs. In common with SMS and text editors, the matched characters may be displayed on a designated text line on the display.

It is expected that during the life of this patent many relevant devices and systems will be developed and the scope of the terms herein, particularly of the terms control signals, wireless, and image sensors, digital images, processing, computing units, and grayscale images are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An autonomous handheld device, comprising:
a drawing module having drawing capabilities for electronically editing a drawing, said editing comprising creating said drawing, changing said drawing and relocating of elements within said drawing; and
a motion sensing feature comprising an image sensor for sensing self-motion; wherein said autonomous handheld device is configured to associate said motion sensing feature with said drawing capability, the motion sensing feature comprising a motion vector detection module adapted to capture digital images during a displacement of said autonomous handheld device, said motion vector detection module being configured for generating a current motion vector of said image sensor in relation to said digital images currently being captured, wherein said motion vector detection module is operatively associated with said drawing module to modify said electronic editing by carrying out said creating, changing and relocating according to said current motion vector thereby to allow sensed motion of said motion sensing feature to modify said electronic editing, and said motion vector detection module is further configured such that said generating a motion vector comprises providing a brightness change compensation mask to convert representational values of pixels of respective grayscale digital image pixels by multiplying each pixel by a constant multiplicative factor whose value is determined according to the position of the multiplied pixel.

2. The autonomous handheld device of claim 1, further comprising a connection to a display device, said drawings being configured to be displayed on said display device.

3. The autonomous handheld device of claim 1, wherein said electronically editing comprises at least one member of the group consisting of: drawing a line on said display device, drawing a graphical object on said display device, selecting colors for graphical objects on said display device, selecting line thicknesses for graphical objects on said display device, coloring graphical objects on said display device, changing textures for graphical objects on said display device, and sizing graphical objects on said display device.

4. The autonomous handheld device of claim 2, wherein said electronically editing comprises maneuvering graphical objects displayed on said display device according to a motion vector generated from currently sensed motion.

5. The autonomous handheld device of claim 1, wherein said digital images comprise a reference frame and a sample frame having background representational information, said motion vector detection module comprises a matching area module adapted to choose the position of a reference area within the boundaries of said reference frame and a matching area within the boundaries of said sample frame and a displacement detection module adapted to generate said current motion vector of the autonomous handheld device based upon the relative positions of said reference area and said matching area, said display device being adapted to generate a display according to said current motion vector.

6. The autonomous handheld device of claim 5, wherein said matching area module is adapted to choose the position of a reference area according to the non-uniformity level of a number of potential first areas, said non-uniformity level is a derivative of the uniformity of values of a respective potential first area's pixels.

7. The autonomous handheld device of claim 1, wherein said image sensor comprises one of the following group: a complementary metal oxide semiconductor (CMOS) sensor and a charged coupled portable autonomous device (CCD) sensor.

8. The autonomous handheld device of claim 1, wherein said autonomous handheld device is one of the following group: a mobile handset, a handheld device, and a processor-based multifunctional portable autonomous device.

9. The autonomous handheld device of claim 1, further comprising an amalgamating module adapted to receive said current motion vector, said amalgamating is configured to amalgamate said current motion vector with a sequence of consecutive motion vectors during said displacement, said drawing module being configured for editing said drawing according to said sequence of consecutive motion vectors.

10. The autonomous handheld device of claim 9, further comprising:
   a movement pattern repository adapted to store a plurality of pattern sample records, each represents a predefined movement pattern; and
   a movement pattern matching module adapted to match between one of said plurality of pattern sample records and said sequence of consecutive motion vectors; wherein said drawing module is configured for editing said drawing according to said match.

11. The device of claim 10, wherein said predefined movement pattern is a non-linear movement pattern.

12. The device of claim 10, wherein said movement pattern matching module is configured to determine according to said match whether said digital images are being taken approximately along respective predefined movement patterns.

13. The device of claim 10, wherein said amalgamating module is adapted to be used for adding a new record to said plurality of pattern sample records, said new record being generated according to said digital images.

14. The device of claim 1, further comprising a user interface, said user interface being configured to allow a user to initiate and terminate the capturing of said digital images.

15. The device of claim 10, wherein each one of said plurality of pattern sample records comprises an array of motion vectors.

16. The autonomous handheld device of claim 10, wherein said drawing module being configured to perform according to said match at least one task of the group consisting of: drawing a graphical object on a display device, selecting colors for graphical objects on a display device, selecting line thicknesses for graphical objects on a display device, coloring graphical objects on a display device, changing textures for graphical objects on a display device, and sizing graphical objects on a display device.

17. The autonomous handheld device of claim 10, wherein said drawing module is configured to draw a character on a display device according to said match.

18. The autonomous handheld device of claim 1, wherein said motion vector detection module is configured to calculate a sum of absolute differences for block matching, thereby to generate said motion vector.

19. The autonomous handheld device of claim 1, wherein said motion vector detection module is configured to generate said motion vector by matching of candidates in successive image captures, said matching of candidates using a helical search track to determine an order of candidates in said matching.

* * * * *